US012346350B2

(12) United States Patent
Isman et al.

(10) Patent No.: US 12,346,350 B2
(45) Date of Patent: Jul. 1, 2025

(54) META-DATA DRIVEN INGESTION AND DATA PROCESSING

(71) Applicant: Ab Initio Technology LLC, Lexington, MA (US)

(72) Inventors: Marshall A. Isman, Newton, MA (US); Adam Weiss, Lexington, MA (US); Jonah Egenolf, Winchester, MA (US); Robert Parks, Weston, MA (US); John MacLean, Bilgola Plateau (AU); Richard Mellon, Winchester, MA (US); Dusan Radivojevic, North Andover, MA (US); Paul Veiser, Heathmont (AU); Mazin Woodrow Khader, Cambridge, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/496,543

(22) Filed: Oct. 27, 2023

(65) Prior Publication Data
US 2024/0346051 A1  Oct. 17, 2024

Related U.S. Application Data

(60) Provisional application No. 63/495,618, filed on Apr. 12, 2023.

(51) Int. Cl.
| G06F 16/20 | (2019.01) |
| G06F 3/048 | (2013.01) |
| G06F 9/448 | (2018.01) |
| G06F 9/451 | (2018.01) |

(Continued)

(52) U.S. Cl.
CPC ............ *G06F 16/288* (2019.01); *G06F 3/048* (2013.01); *G06F 9/4494* (2018.02); *G06F 9/451* (2018.02); *G06F 16/908* (2019.01)

(58) Field of Classification Search
CPC ...... G06F 16/288; G06F 16/908; G06F 3/048; G06F 9/4494; G06F 9/451
See application file for complete search history.

(56) References Cited

U.S. PATENT DOCUMENTS

| 5,966,072 A | 10/1999 | Stanfill et al. |
| 7,908,076 B2 | 3/2011 | Downs et al. |
| 9,454,578 B2 | 9/2016 | Anzalone et al. |

(Continued)

FOREIGN PATENT DOCUMENTS

EP    4155965    3/2023

OTHER PUBLICATIONS

Broadcom.com [online], "Adding/Modifying Virtual Fields," Sep. 26, 2023, retrieved from URL<https://techdocs.broadcom.com/us/en/ca-enterprise-software/it-operations-management/ca-2e/8-7/defining-ca-2e-data-models/maintaining-your-data-model/adding-modifying-virtual-fields.html>, 3 pages.

(Continued)

*Primary Examiner* — Diedra McQuitery
(74) *Attorney, Agent, or Firm* — Fish & Richardson P.C.

(57) ABSTRACT

A method implemented by a data processing system for enabling a system to pipeline or otherwise process data in conformance with specified criteria by providing a graphical user interface for selecting data to be processed, determining metadata of selected data, and, based on the metadata, automatically processing the selected data in conformance with the specified criteria.

23 Claims, 38 Drawing Sheets

(51) Int. Cl.
  *G06F 16/28* (2019.01)
  *G06F 16/908* (2019.01)

(56) References Cited

U.S. PATENT DOCUMENTS

| | | | |
|---|---|---|---|
| 9,817,561 | B2 | 11/2017 | Mital et al. |
| 9,959,267 | B2 | 5/2018 | Folting et al. |
| 10,122,783 | B2 | 11/2018 | Qiao et al. |
| 10,831,509 | B2 | 11/2020 | Ravid et al. |
| 10,997,244 | B2* | 5/2021 | Russell .................. G06F 16/27 |
| 11,210,285 | B2 | 12/2021 | Egenolf et al. |
| 11,281,673 | B2 | 3/2022 | Nanda et al. |
| 2008/0082959 | A1 | 4/2008 | Fowler |
| 2010/0138431 | A1* | 6/2010 | Bator .................. G06F 16/40 707/755 |
| 2010/0185618 | A1 | 7/2010 | Peterson |
| 2017/0177446 | A1 | 6/2017 | MacLean et al. |
| 2017/0371926 | A1 | 12/2017 | Shiran et al. |
| 2018/0144067 | A1* | 5/2018 | Chatelain .............. G06F 16/164 |
| 2018/0173795 | A1* | 6/2018 | Cobbett ................ G06F 16/316 |
| 2018/0253477 | A1* | 9/2018 | Schoueri ............... G06F 16/10 |
| 2019/0130048 | A1 | 5/2019 | Egenolf et al. |
| 2020/0026708 | A1* | 1/2020 | Ahn ..................... G06F 9/5005 |
| 2021/0004244 | A1 | 1/2021 | Ravid et al. |
| 2021/0374109 | A1 | 12/2021 | Shimanovsky et al. |
| 2022/0004561 | A1 | 1/2022 | Sherman |

OTHER PUBLICATIONS

Dreamio.awsworkshop.io [online], "Amazon—Editing a Virtual Dataset," retrieved on or before May 26, 2022, retrieved from URL<https://dremio.awsworkshop.io/50-create-virtual-datasets/504-edit-vitual-dataset.html>, 3 pages.
Infocepts.ai [online], "Achieve Real-Time Data Analysis with a Virtual Data Warehouse," retrieved on Jan. 19, 2016, retrieved from URL<https://infocepts.ai/blog/achieve-real-time-data-analysis-with-a-virtual-data-warehouse/>, 6 pages.
Informatica.com [online], "Creating an External Resource for the Aggregate View," Jan. 2023, retrieved from URL<https://docs.informatica.com/master-data-management/customer-360/10-3/installation-and-configuration-guide/after-you-install/integrating-informatica-mdm---relate-360/creating-an-external-resource-for-the-aggregate-view.html>, 3 pages.
Rockset.com [online], "Real-Time Analytics in the World of Virtual Reality and Live Streaming," Sep. 6, 2019, retrieved from URL<https://rockset.com/blog/real-time-analytics-virtual-reality-live-streaming/>, 10 pages.
Segment.com [online], "Create real-time audiences (campaigns, lookalikes, ad suppression, etc.)," retrieved on or before May 26, 2022, retrieved from URL<https://segment.com/use-cases/create-real-time-audiences/>, 2 pages.
Setiadji et al., "Development of Back-calculation Model for Aggregate Gradation Determination Using Fractal Theory," MATEC Web of Conferences, 2018, 159:01006, 6 pages.
Splunk.com [online], "Stream Processor Service: Function Reference," retrieved on Jun. 9, 2022, retrieved from URL<www.splunk.com>, 5 pages.
Tibco.com [online], "Aggregating Data," retrieved on May 25, 2022, retrieved from URL<https://docs.tibco.com/pub/spotfire_server/10.6.1/doc/html/en-US/TIB_sfire_bauthorconsumer_usersguide/GUID-B8AB864D-7472-4B92-BD4E-00F508AC8FE2.html>, 3 pages.
Tibco.com online, "Anything 360," retrieved on Aug. 22, 2023, retrieved from URL<https://www.tibco.com/solutions/anything-360>, 6 pages.
TowardsDataScience.com online, "The Anatomy of an Active Metadata Platform," Aug. 12, 2021, retrieved on Aug. 22, 2023, retrieved from URL<https://towardsdatascience.com/the-anatomy-of-an-active-metadata-platform-1347309 1ad0d>, 18 pages.
Farinha et al., "An Extensible Metadata Framework for Data Quality Assessment of Composite Structures," In Data Warehousing and Knowledge Discovery: 9th International Conference, Sep. 3, 2007, p. 34-44.
International Search Report and Written Opinion in International Appln. No. PCT/US2024/024348, mailed on Jul. 22, 2024, 15 pages.
U.S. Appl. No. 15/795,917, Egenolf et al., filed Oct. 27, 2017.
U.S. Appl. No. 15/993,284, Dickie, filed May 30, 2018.
U.S. Appl. No. 16/794,361, Butler et al., filed Feb. 19, 2020.

* cited by examiner

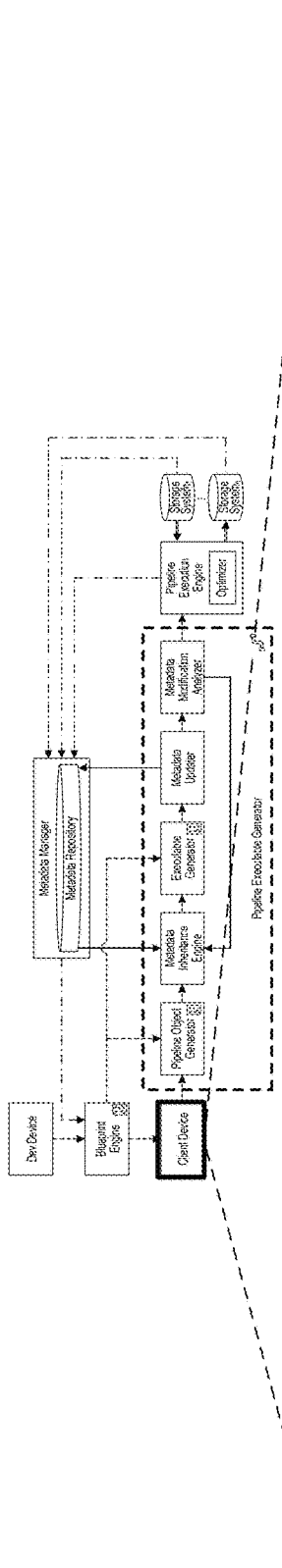
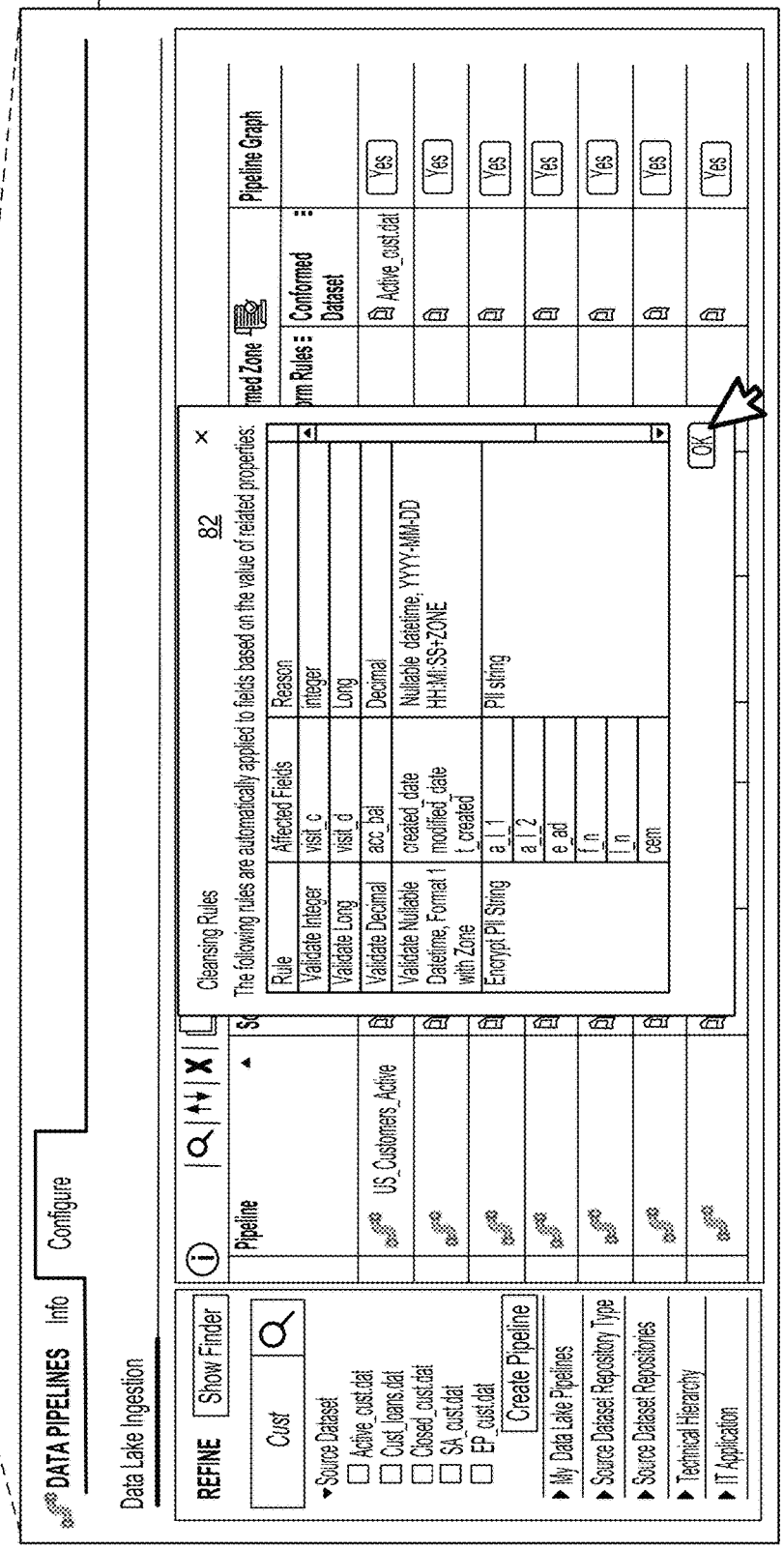
FIG. 5B

| Business Assets > System of Record > Trade Debtors management System |
|---|
| BUSINESS APPLICATION |
| Trade Debtors Management System  ( ✓ Published ) |

- ⓘ Info
- ∨ Controls & DQ
- ⇄ Lineage
- ↻ Versions
- 🔒 Permissions

Scores  Controls

Metrics

| Accuracy | ⊘ 100% | Completeness | ⊘ 100% | Validity | ⊘ 100% |

Controls — 86 / 87

| Name | Short Description | Controlled Asset | Metric | Score | Total Records | Records with issues |
|---|---|---|---|---|---|---|
| ✧ DQCPK-1006 | All TST dates must be greater than 1/1/1900 | Trade Debtors Management System | ○ Validity | ⊘ 100% | 10,000,000 | 0 |
| ✧ DQCPK-1005 | All required data elements should be Populated in the TST Source System | Trade Debtors Management System | ○ Completeness | ⊘ 100% | 25,000,000 | 0 |
| ✧ DQCPK-1004 | All TST data elements with reference codesets must have values in their respective codeset. | Trade Debtors Management System | ○ Validity | ⊘ 100% | 20,000,000 | 0 |
| ✧ DQCP-1211 | Payment date must be after contract start date | Underlying payment Date | ○ Validity | ⊘ 100% | 5,000,000 | 0 |
| ✧ DQCP-1213 | Deal Underlying Payment Account in TST values | Deal Underlying Payment Amount | ○ Accuracy | ⊘ 100% | 5,000,000 | 0 |

5 rows

FIG. 6B

META-DATA DRIVEN INGESTION AND DATA PROCESSING

CLAIM OF PRIORITY

This application claims priority under 35 U.S.C. § 119(e) to U.S. Patent Application Ser. No. 63/495,618, filed on Apr. 12, 2023, the entire contents of which are hereby incorporated by reference.

TECHNICAL FIELD

This disclosure relates to techniques for enabling a data processing system to pipeline or otherwise process data in conformance with specified criteria.

BACKGROUND

Modern data processing systems manage vast amounts of data within an enterprise. A large enterprise, for example, may have millions of datasets. These datasets can support multiple aspects of the operation of the enterprise. Complex data processing systems typically process data in multiple stages, with the results produced by one stage being fed into the next stage. The overall flow of information through such systems may be described in terms of a directed dataflow graph, with nodes or vertices in the graph representing components (either data files or processes), and the links or "edges" in the graph indicating flows of data between the components. A system for executing such graph-based computations is described in U.S. Pat. No. 5,966,072, titled "Executing Computations Expressed as Graphs," incorporated herein by reference.

In many cases, an enterprise's data is spread across multiple disparate data sources, and the enterprise needs to bring these data together to facilitate data storage and analysis. To do so, the enterprise can employ a data ingestion process by which data is moved from one or more data sources to a destination, such as a data lake, a data warehouse, or another data storage system. Once ingested, the data can be stored, analyzed, or otherwise used.

SUMMARY

In general, in a first aspect, a method implemented by a data processing system for processing data in conformance with specified criteria by providing a graphical user interface for selecting data to be processed, determining metadata of selected data, and, based on the metadata, automatically processing the selected data in conformance with the specified criteria, includes: receiving, by the data processing system, a specification that specifies logical metadata and one or more operations to be performed on data associated with the logical metadata; providing, by the data processing system, a user interface for indicating one or more datasets to be retrieved and processed; receiving, from the user interface, a user indication of a given dataset; and responsive to at least the user indication, generating one or more instructions that are executable to process the given dataset in accordance with the specification; identifying technical metadata for the given dataset; accessing a metadata model that specifies relationships among logical metadata and technical metadata; traversing the metadata model to identify a relationship among (i) an item of logical metadata in the metadata model, and (ii) an item of technical metadata in the metadata model corresponding to an item of technical metadata for the given dataset; and updating the one or more instructions in accordance with the identified relationship among (i) the item of logical metadata in the metadata model, and (ii) the item of technical metadata in the metadata model corresponding to the item of technical metadata for the given dataset.

In a second aspect combinable with the first aspect, traversing includes: traversing the metadata model to identify a relationship among (i) an item of logical metadata in the metadata model corresponding to logical metadata of the specification, and (ii) an item of technical metadata in the metadata model corresponding to an item of technical metadata for the given dataset; and updating includes: updating the one or more instructions to specify that at least one of the one or more operations are performed on data represented by the item of technical metadata in the metadata model corresponding to the item of technical metadata for the given dataset.

In a third aspect combinable with the first or second aspects, the method includes, based on the traversing, identifying a data quality control to be applied to the item of technical metadata in the metadata model corresponding to the item of technical metadata for the given dataset; and wherein updating includes: updating the one or more instructions with additional instructions to apply the data quality control the item of technical metadata for the given dataset.

In a fourth aspect combinable with any of the first through third aspects, the method includes updating the metadata model based on the one or more instructions of the executable; detecting that the one or more instructions of the executable causes updating of the metadata model; traversing the metadata model to identify one or more relationships among (i) data added to the metadata model based on the updating, and (ii) other data in the metadata model; and based on the identified one or more relationships, updating the one or more instructions in accordance with the one or more relationships among (i) the data added to the metadata model based on the updating, and (ii) the other data in the metadata model.

In a fifth aspect combinable with any of the first through fourth aspects, the method includes based on determining no additional updates to the metadata model, outputting an executable with updated instructions for execution; or storing the executable for execution.

In a sixth aspect combinable with any of the first through fifth aspects, the method includes receiving, from a metadata system, identifiers of data that are candidates for processing in accordance with the specified criteria; and causing the user interface to render graphical visualizations of the identifiers.

In a seventh aspect combinable with any of the first through sixth aspects, the method includes: executing the updated instructions on the given dataset.

In an eighth aspect combinable with any of the first through seventh aspects, technical metadata includes metadata describing one or more physical attributes of stored data, such as its technical name, structure, and/or storage location.

In a ninth aspect combinable with any of the first through eighth aspects, logical metadata includes metadata that provides meaning or context to data, such as its semantic or business name and/or its relation to other data within an ontology.

In a tenth aspect combinable with any of the first through ninth aspects, the method includes executing the updated instructions to process the given dataset in accordance with the specification.

In an eleventh aspect combinable with any of the first through tenth aspects, the executing of the updated instructions includes performing the operations on the given dataset.

In a twelfth aspect combinable with any of the first through eleventh aspects, the logical metadata is or refers to personally identifiable information.

In a thirteenth aspect combinable with any of the first through twelfth aspects, the technical metadata identifies a field in a dataset, such as the given dataset.

In a fourteenth aspect combinable with any of the first through thirteenth aspects, the one or more operations include one or more data synthetization operations, such as masking, hashing, reducing, generalizing and/or obfuscating.

In a fifteenth aspect combinable with any of the first through fourteenth aspects, the logical metadata of the item of logical metadata in the metadata model is specified by the specification and refers to personal identifiable information, and the executing of the updated instructions includes performing one or more data synthetization operations specified by the specification on data specified by the item of technical metadata for the given dataset corresponding to the item of technical metadata in the metadata model that is related to the item of logical metadata in the metadata model.

In general, in a sixteenth aspect, one or more machine-readable hardware storage devices for processing data in conformance with specified criteria by providing a graphical user interface for selecting data to be processed, determining metadata of selected data, and, based on the metadata, and automatically processing the selected data in conformance with the specified criteria, the one or more machine-readable hardware storage devices storing instructions that are executable by one or more processing devices to perform the operations of any of the first through fifteenth aspects. In general, in a seventeenth aspect, a system for processing data in conformance with specified criteria by providing a graphical user interface for selecting data to be processed, determining metadata of selected data, and, based on the metadata, automatically processing the selected data in conformance with the specified criteria, includes: one or more processing devices; and one or more machine-readable hardware storage devices storing instructions that are executable by one or more processing devices to perform the operations of any of the first through fifteenth aspects.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One or more of the above aspects may provide one or more of the following advantages.

The techniques described herein enable data processing in an efficient reliable manner, with less latency, fewer errors and increased accuracy-relative to previously known methods. Through the use of a blueprint that specifies the processing requirements (e.g., such as requirements for cleaning, conforming and transforming), the system described reliably and accurately applies those requirements to data being retrieved and/or data that is stored in the system. The system achieves reduced latency because the system can process this data in near real-time (with regard to when the request is sent) versus having to wait for a lengthy code generation and debugging process. Additionally, these techniques improve accuracy of applying criteria (e.g., mask PII) because a metadata model is provided. Through the metadata model, the system can contribute to assigning data to operations to be applied to the data, set data quality rules, data types and data controls at a system wide level or at a top level of the metadata model. Lower level nodes automatically inherit those data quality rules, data types and data controls.

The metadata model includes nodes representing types or names of data. In the metadata model, the nodes are connected by edges representing relationships among the nodes. In an example, a node in the metadata model may represent SSN data. This node is referred to as the SSN node. In turn, the SSN node may be related to nodes specifying names of data fields for storing SSNs. The names of these data fields may be: hd73 and j343. The nodes representing these data fields are referred to as data field nodes. The SSN node is a parent node to the data field nodes. A parent node is a node in a level of the metadata model that is higher than a level of other nodes. As such, the data field nodes inherit from the SSN node. In this example, the system specifies that SSN is personally identifiable information (PII) by creating a node in the metadata model, labeling that created node as PII (e.g., PII node) and generating an edge between the SSN node and the PII node. Now, an attribute of the SSN node is PII. The data field nodes inherit this attribute. As such, each of the data fields are now labeled as PII, which effectively and reliably keeps the data secured. This contributes to data security.

Inheritance refers to the attributes of a parent node being associated with child nodes of that parent node. A child node is a node that is at a level in the metadata model that is lower than a level of another node. In this example, if the blueprint includes an instruction to "Mask PII", the blueprint does not need to specify which fields in the dataset being ingested are PII. Rather, once the ingestion process starts, the system described herein traverses the metadata model to identify nodes representing fields in the dataset and then traverses upward to inherit attributes. If this dataset includes a field of hd73, then this field will inherit the attributes of the SSN node and the field of hd73 is marked as PII (e.g., is associated with an attribute with a value of PII). Based on this traversal, the system updates instructions (based on contents of the blueprint) to mask hd73. This process of inheritance increases the accuracy of the ingestion process, because a data type or attribute can be set for a parent node and fields of a dataset (or a dataset itself) will automatically inherit the attributes if the dataset (or field) represents a child node related to the parent node.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A-5D are diagrams illustrating cleansing rules and a preview of their output.

FIGS. 6A-6C are diagrams illustrating data quality rules and their application.

DETAILED DESCRIPTION

Figure 1:
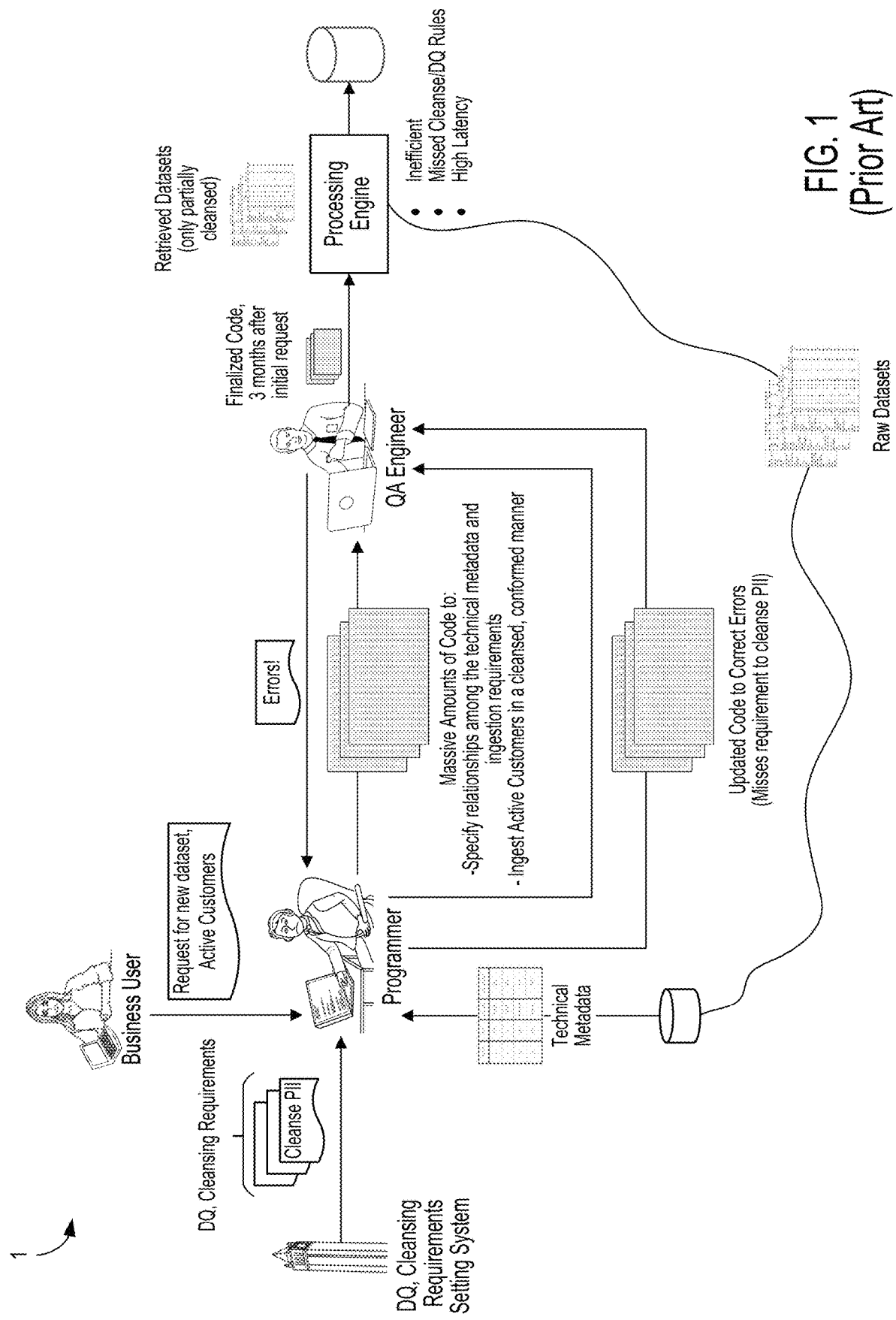
FIG. 1 is a block diagram of a system.

Referring to FIG. 1, an inefficient system for data ingestion is shown. In this example, a business user may request a new dataset. In this example, a new dataset is named active customers. Additionally, a data quality and cleansing requirement setting system may specify data quality and cleansing requirements that must occur (e.g., for reasons of data security) before data is ingested. The programmer receives the request for the new dataset. Using technical metadata, the programmer tries to identify all of the fields and datasets in active customers to which the data quality and cleansing requirements apply. After doing so, code is generated and sent to a Quality Assurance (QA) Engineer. Due to the massive amount of technical metadata, data quality rules, and cleansing rules that must be accounted for in the code, the QA Engineer inevitably finds errors and notifies the programmer of these errors. In turn, the programmer generates more code to address these errors and the result is a massive amount of code to specify the relationships among the technical metadata and the data quality and cleansing requirements to ultimately ingest the requested dataset in a cleansed, conformed matter (e.g., to maintain data security). This cycle of the programmer fixing errors and the QA Engineer finding new errors can go on and on for months. In this example, after three months, the programmer has finally generated code that the QA Engineer determines is error free or near error free. That code is sent to the ingestion engine which executes the code to ingest the datasets. The datasets that are finally ingested will have missed cleansing and data quality rules, plus there will be a high latency because it will often take weeks or months from when there's a request to ingest the new dataset to when it is actually ingested. Additionally, this process is incredibly inefficient as there is no metadata inheritance or attribution as described herein. Overall, the ingestion system shown in FIG. 1 is inefficient, inaccurate, and involves a high amount of latency Referring to FIG. 2A, system 10 is shown for ingesting data in an efficient and reliable manner. In this example, system 10 includes pipeline executable generator 14 which generates an executable (e.g., code or other logic) that, when executed, automatically ingests datasets in a cleansed and conformed manner. Pipeline executable generator 14 includes pipeline object generator 15. Pipeline object generator 15 generates a pipeline object, including, for example, a data object or other data structure specifying actions to be performed in ingesting data. Pipeline executable generator 14 also includes metadata inheritance engine 16, which retrieves from metadata repository 24 data quality rules and controls that are associated with the data that is being ingested. Executable generator 17 generates an executable for retrieving specified datasets and performing actions on them specified in the pipeline object. Metadata updater 18 updates metadata repository 24 with information about the executable that is generated and also with information specifying new datasets or fields that executable generator 17 specifies should be generated. Metadata modification analyzer 19 looks for metadata updates from metadata updater 18 and, when there is a metadata update, metadata modification analyzer 19 transmits a request back to metadata inheritance engine 16 to see which data quality rules and/or controls are inherited by the new data specified or represented by the new metadata. Pipeline execution engine 21 executes an executable generated by executable generator 17, for example, when there are no additional metadata updates. Optimizer 20 can optionally optimize the executable prior to execution, as described in U.S. patent application Ser. No. 15/993,284, titled "Systems and Methods for Dataflow Graph Optimization," the entire content of which is incorporated herein by reference.

System 10 also includes developer device 11 for generating a blueprint. Generally, a blueprint (sometimes referred to as a specification) includes logic specifying how data is processed (e.g., cleansed and conformed) prior to storage (e.g., ingestion). Because the blueprint is specified prior to a time of ingestion or processing, a dataset to be processed can simply be requested and automatically processed in real-time in accordance with the blueprint. As described herein, a blueprint defines logic in terms of logical metadata rather than technical metadata-such that the logic can be described system wide and independent of any particular dataset. In general, technical metadata includes metadata that describes physical attributes of stored data, such as its technical name (e.g., dataset name, field name, etc.), structure (e.g., record format), and storage location. Logical metadata includes metadata that gives meaning or context to data, such as its semantic or business name and its relation to other data within an ontology. System 10 also includes blueprint engine 12 that transmits the blueprint or portions of the blueprint to various other devices. System 10 includes client device 13 for specifying one and more datasets to be ingested. System 10 also includes metadata manager 23 and metadata repository 24, which may include a data catalog. System 10 also includes storage systems 22a . . . 22n.

Figure 2A:
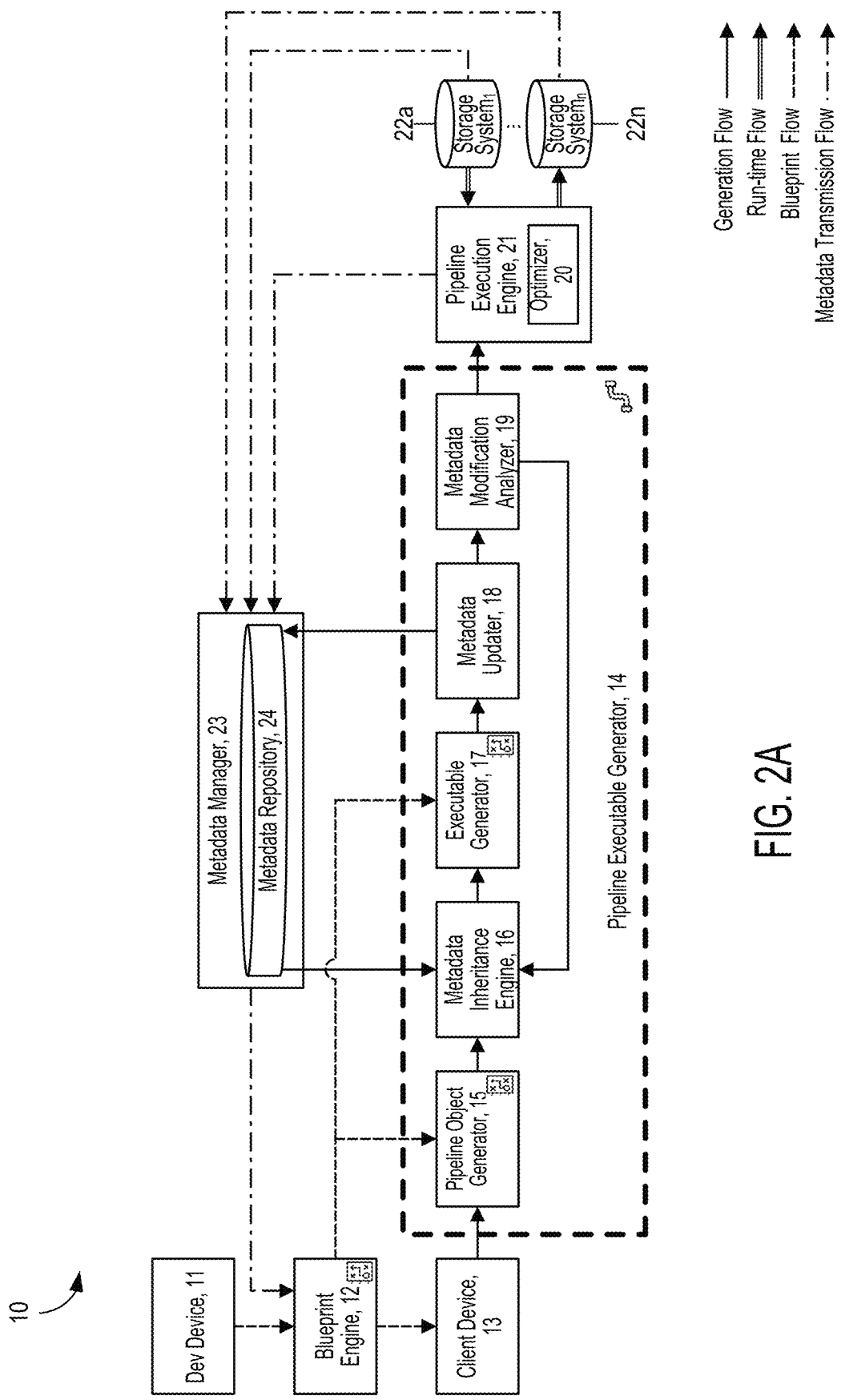
FIGS. 2A and 2B are diagrams of a system for self-service data pipelining.
Figure 2B:
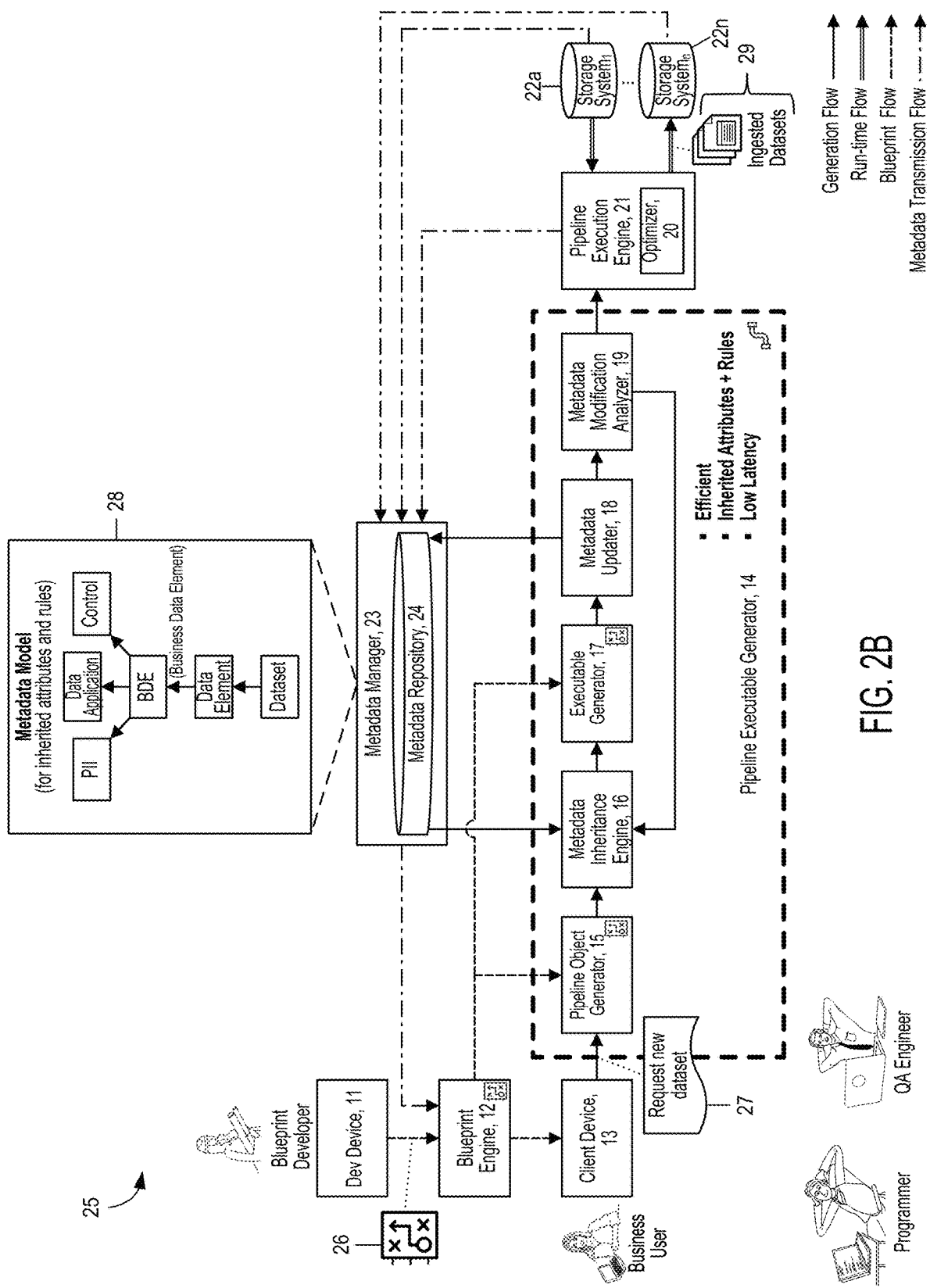

Referring to FIG. 2B, environment 25 illustrates the automatic and efficient ingestion of datasets in response to a simple request 27 from a user, such as submitted by the user via client device 13. These datasets are represented as ingested datasets 29. Metadata manager 23 includes metadata model 28. Metadata model 28 specifies relationships amongst different kinds of data including datasets, data elements, business data elements, data applications, controls and PII data. Generally, a control includes logic and/or instructions that specify one or more rules and one or more actions to be taken. The metadata model 28 allows for metadata inheritance because certain data represented in the metadata model is linked or associated with, for example, controls or PII. In this example, blueprint developer uses developer device 11 to generate a blueprint 26. A blueprint 26 includes generation rules and a template. Generation rules specify rules to be applied to the data that's being ingested. The template specifies which parts of the generation rules are exposed to a user to enable that user to view and/or modify them. The pipeline executable generator 14 may read and process the metadata model 28 and/or receive information specifying attributes and/or rules to be associated with the dataset being processed. This is because the generation rules may be defined with regard to logical metadata (represented by nodes) in the metadata model 28. For example, a generation rule may specify to mask PII. In this example, the generation rule doesn't actually specify which fields of a dataset to be masked. As such, when applying generation rules, the metadata inheritance engine determines which data elements are associated with the node representing PII in the metadata model 28.

Figure 3A:
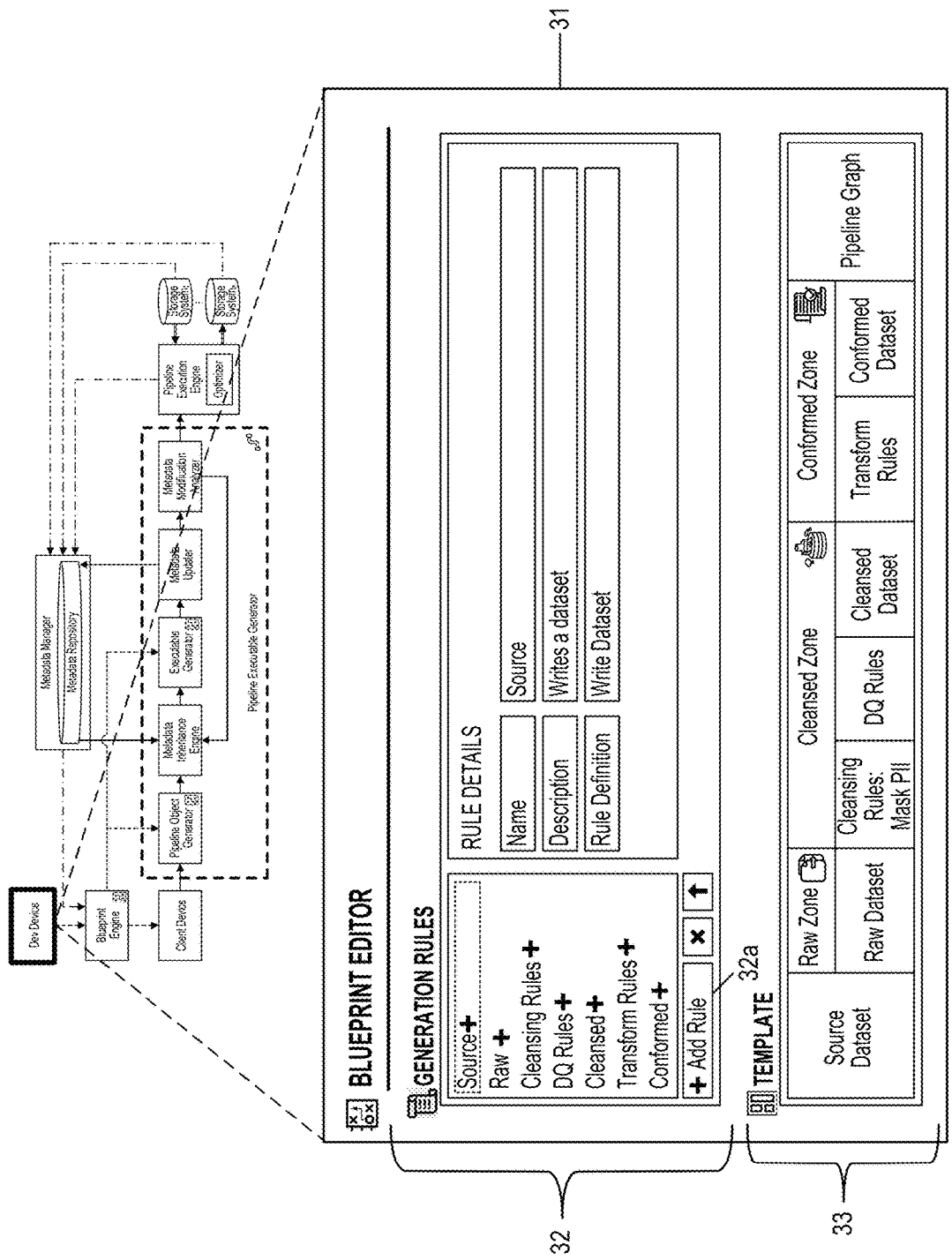
FIGS. 3A-3S are diagrams of the system of FIG. 2A in stages of data pipelining.

Referring to FIG. 3A, graphical user interface 31 is displayed on the developer device. Graphical user interface 31 displays a rendering of blueprint editor for a blueprint developer to specify generation rules and a template. Generally, a blueprint editor includes logic for i) specifying and storing generation rules, ii) specifying and storing a template, and iii) specifying that for each of the one or more generation rules created or stored that a portion of the template corresponds to that generation rule (e.g., logic for exposing the generation rules (or portions thereof) through the template—for example, for editing and/or viewing).

Graphical user interface 31 includes portion 32 for specifying and viewing generation rules. Generally, a generation rule includes a rule that specifies one or more operations to be performed on a dataset being ingested or processed. The rule is defined with regard to logical metadata (e.g., data that provides semantic meaning to technical metadata). For example, PII is logical metadata. A rule could be defined as "mask PII". This rule is referred to as the PII rule. The system described herein determines which fields of a dataset to apply the PII rule by traversing a metadata model to identify technical metadata (identifying the fields of the dataset) that is associated with the PII logical metadata. In this way, the generation rules provide for abstraction and can be automatically applied to new datasets that are being ingested into the system (once the metadata model has been updated in accordance with those new datasets).

Portion 32 includes control 32a, selection of which enables a user to add a new generation rule. Graphical user interface 31 includes portion 33 that represents the template. As previously described, the template specifies which portions of the generation rules are exposed to a user. Additionally, the blueprint editor includes logic for generating the one or more cells shown in portion 33. For example, when a user creates a raw generation rule, the blueprint editor includes logic for generating a raw zone with a raw dataset. In this example, the contents of graphical user interface 31 are a visual rendering of the logic of the blueprint editor.

Figure 3B:
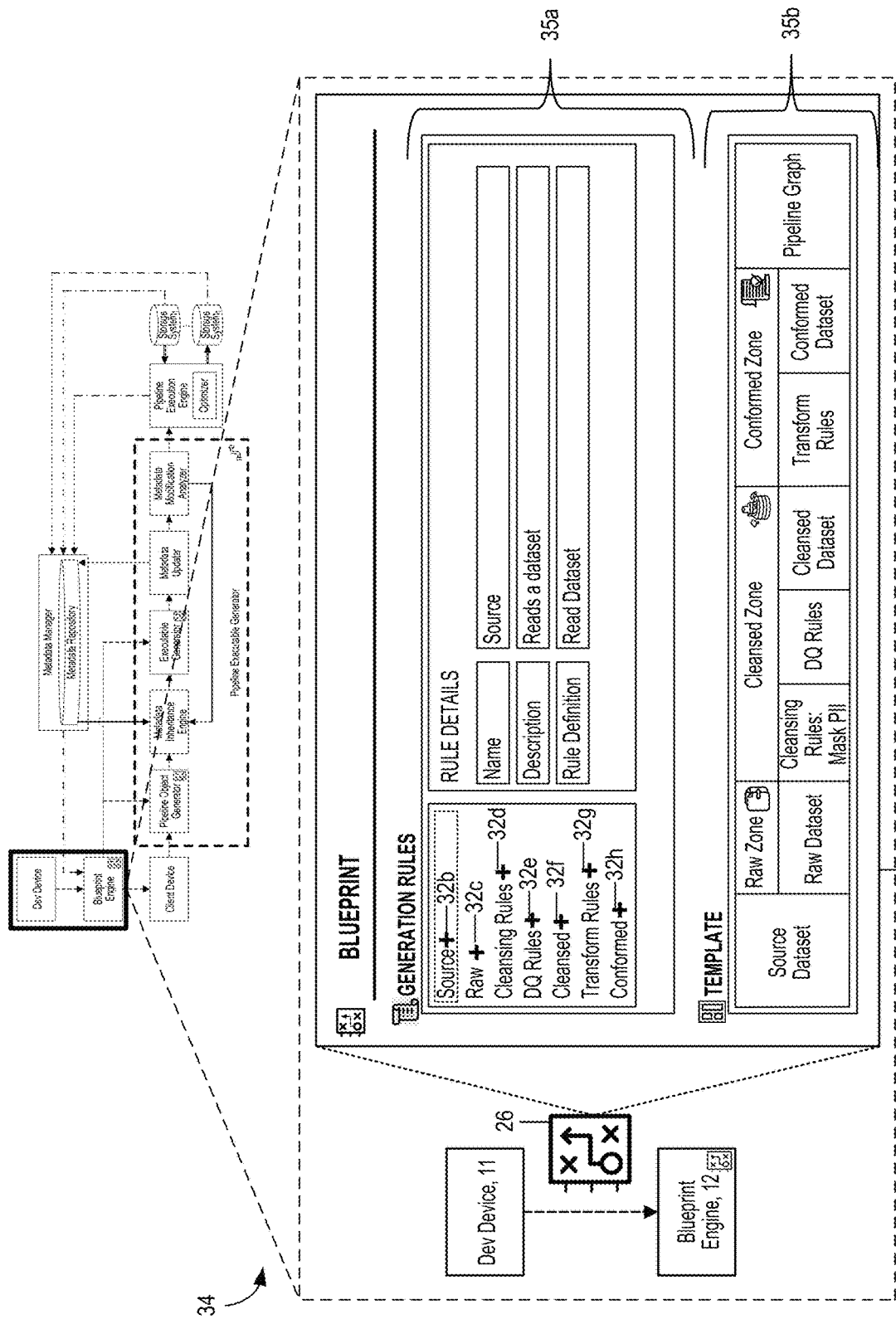

Referring to FIG. 3B, view 34 illustrates blueprint 26 being transmitted from developer device 11 to blueprint engine 12. The contents of blueprint 26 are shown in visualization 35 that includes portion 35a, which represents a generation rule, and portion 35b, which represents the template. Portion 35a displays visual representations 32b-32h, each of which represents an associated generation rule.

Figure 3C:
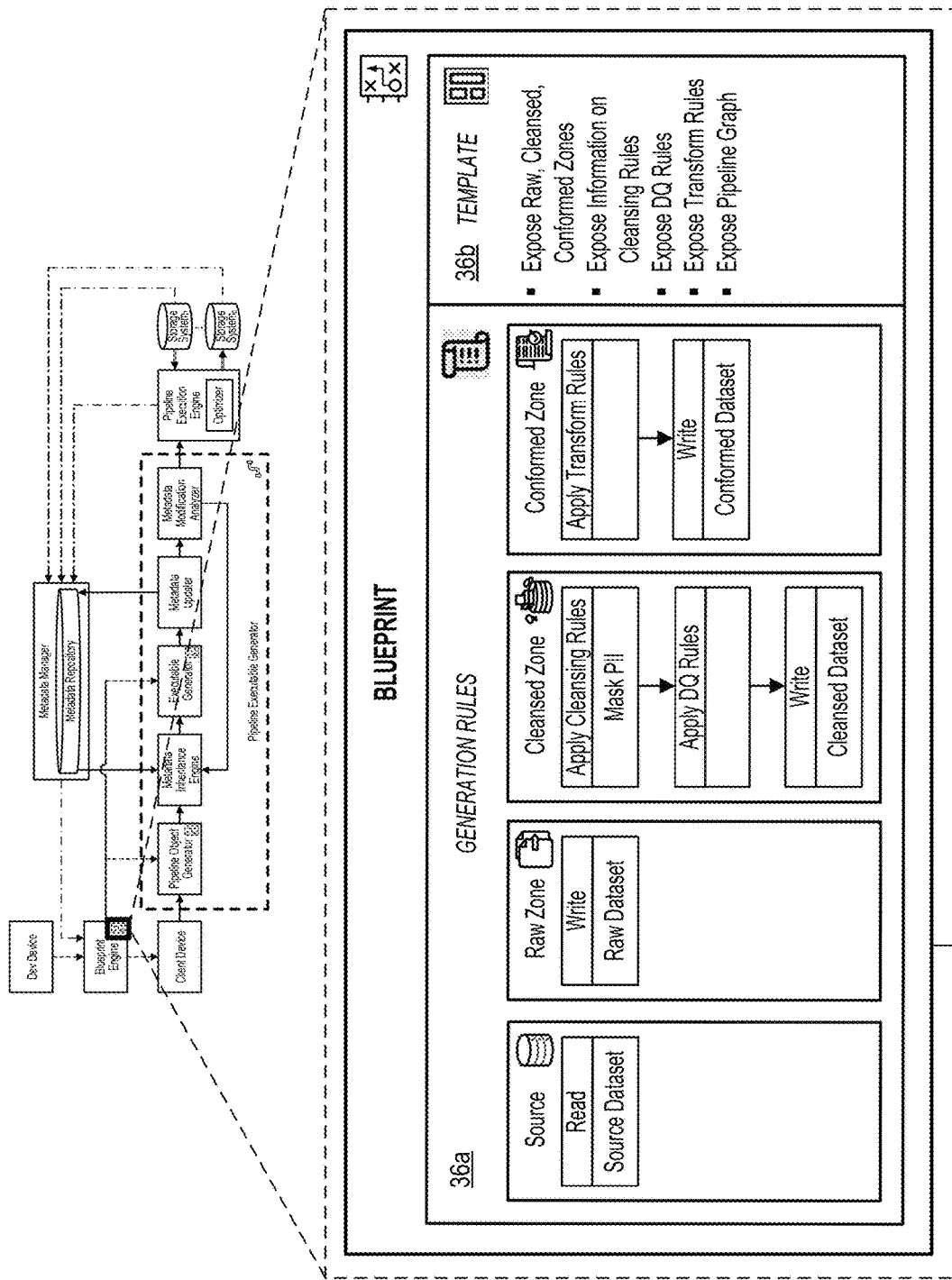

Referring to FIG. 3C, graphical user interface 36 shows an alternate form of a blueprint. In this example, blueprint includes generation rules 36a and template 36b. Generation rules are shown graphically and show the logic of each of the generation rules. Template 36b describes a functionality that should be performed with regard to each of the generation rules or a portion thereof.

In some examples, a single blueprint can have multiple different modes that are each used to generate different executables, thereby obviating the need to create new blueprints that are doing variants of some processing. For example, a "Data Lake Ingestion" blueprint can support the following three modes (although different modes and/or a different number of modes can be supported without departing from the scope of the present disclosure):
1. Insert (e.g., insert new dataset into a data lake)
2. Time Variant (e.g., compares today's data against data from a previous period, performs change data capture (CDC), and outputs a time variant dataset into a data lake)
3. Archive Reload (e.g., takes a user-specified data range and reloads a dataset from archived data using a more efficient single pass algorithm)

In this way, each mode generates an entirely different executable (e.g., dataflow graph topology), while the logic to control the executable generation resides within a single blueprint. In addition, the selection among different modes can be controlled by metadata. For example, a user can interact with a drop-down list in the "Pipeline Graph" column (see column 40g of FIG. 3E) to select which generation mode and hence which executable they would like to generate.

Figure 3D:
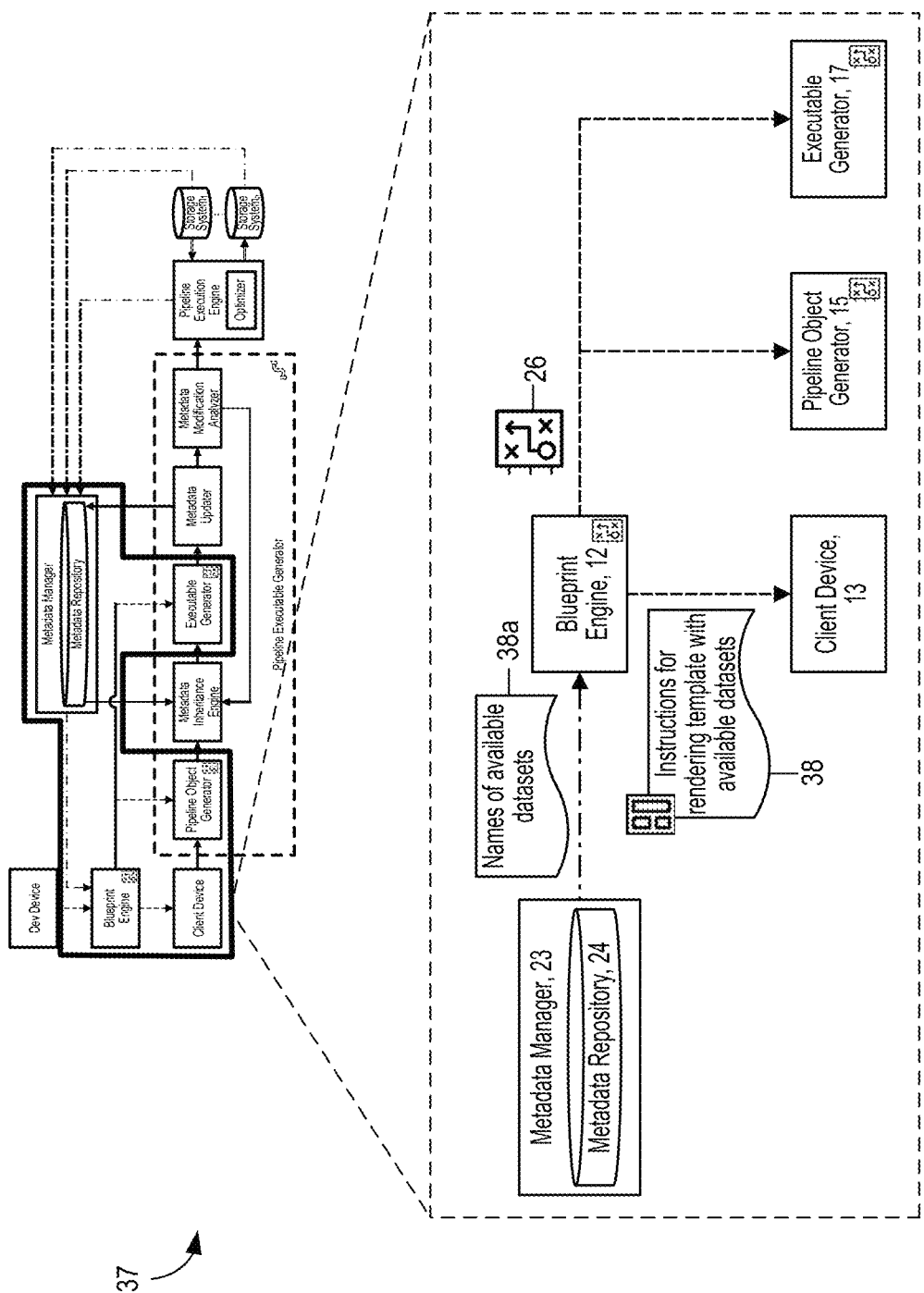

Referring to FIG. 3D, view 37 shows communication among the metadata manager 23, blueprint engine 12, client device 13, pipeline object generator 15 and executable generator 17. Metadata manager 23 transmits to the blueprint engine 12 data 38a specifying names of available datasets including, for example, datasets that are available for ingestion. In this example, metadata manager 23 originally determines the names of these available datasets or identifiers of these datasets based on technical metadata. In this example, metadata manager 23 receives from storage systems 22a . . . 22n (as shown in FIG. 2A) technical metadata specifying or otherwise identifying the datasets of the field within those storage systems. Using this received technical metadata, metadata manager 23 generates the names of the available datasets. Blueprint engine 12 uses the blueprint 26 with data 38a specifying the names of the available datasets to generate instructions 38. In particular, instructions 38 are instructions for rendering a visualization of the template with the available datasets. In generating instructions 38, blueprint engine 12 utilizes the template (as visually depicted in portion 35b (FIG. 3B)) of blueprint 26. Blueprint engine 12 also transmits blueprint 26 to pipeline object generator 15 and executable generator 17. In this example, blueprint engine 12 is configured to use the template specified in the blueprint 26 and update it with a rendering of the available datasets that can be selected for ingestion, as subsequently described with reference to FIG. 3F.

Figure 3E:
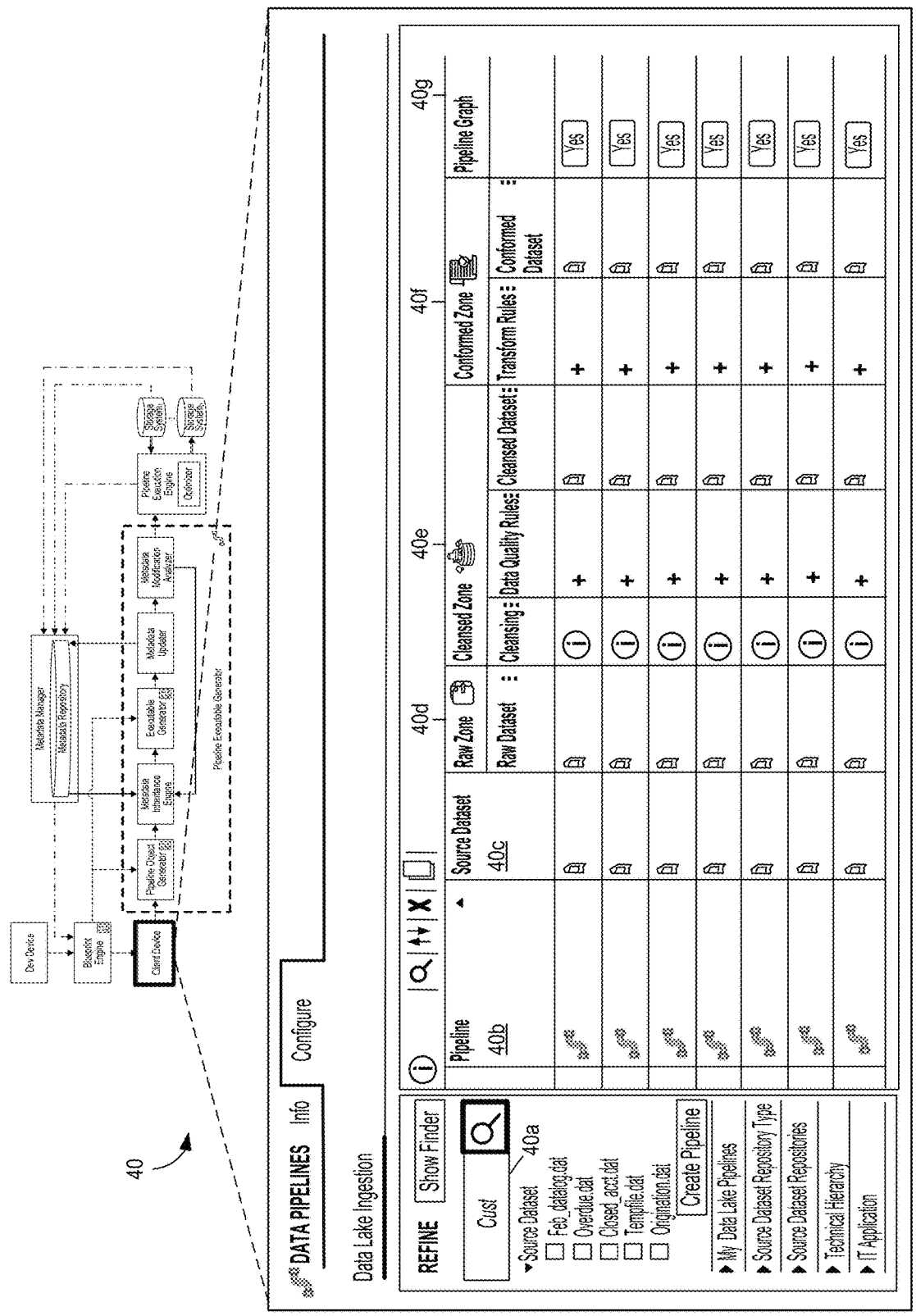

Referring to FIG. 3E, graphical user interface 40 illustrates the rendering of instructions 38. In particular, graphical user interface 40 includes columns 40b, 40c, 40d, 40e, 40f, and 40g. In this example, column 40b specifies the name of a pipeline. Column 40c specifies the names of source datasets that are being ingested into the system. Column 40d specifies that each source dataset will need to be copied before any additional functionality is performed. Column 40e specifies that the datasets to be ingested will be cleansed. Column 40f specifies that the datasets to be ingested will be conformed. Column 40g includes controls, selection of which enables generation of the underlying logic to actually perform the ingestion. In this example, each of these columns are specified in the blueprint. That is, in this example, the blueprint specifies the columns and through user interface 40, a user can specify values for those columns or view attributes of those columns. Graphical user interface 40 also includes search box 40a, unto which a user can search for a particular dataset to be ingested.

Figure 3F:
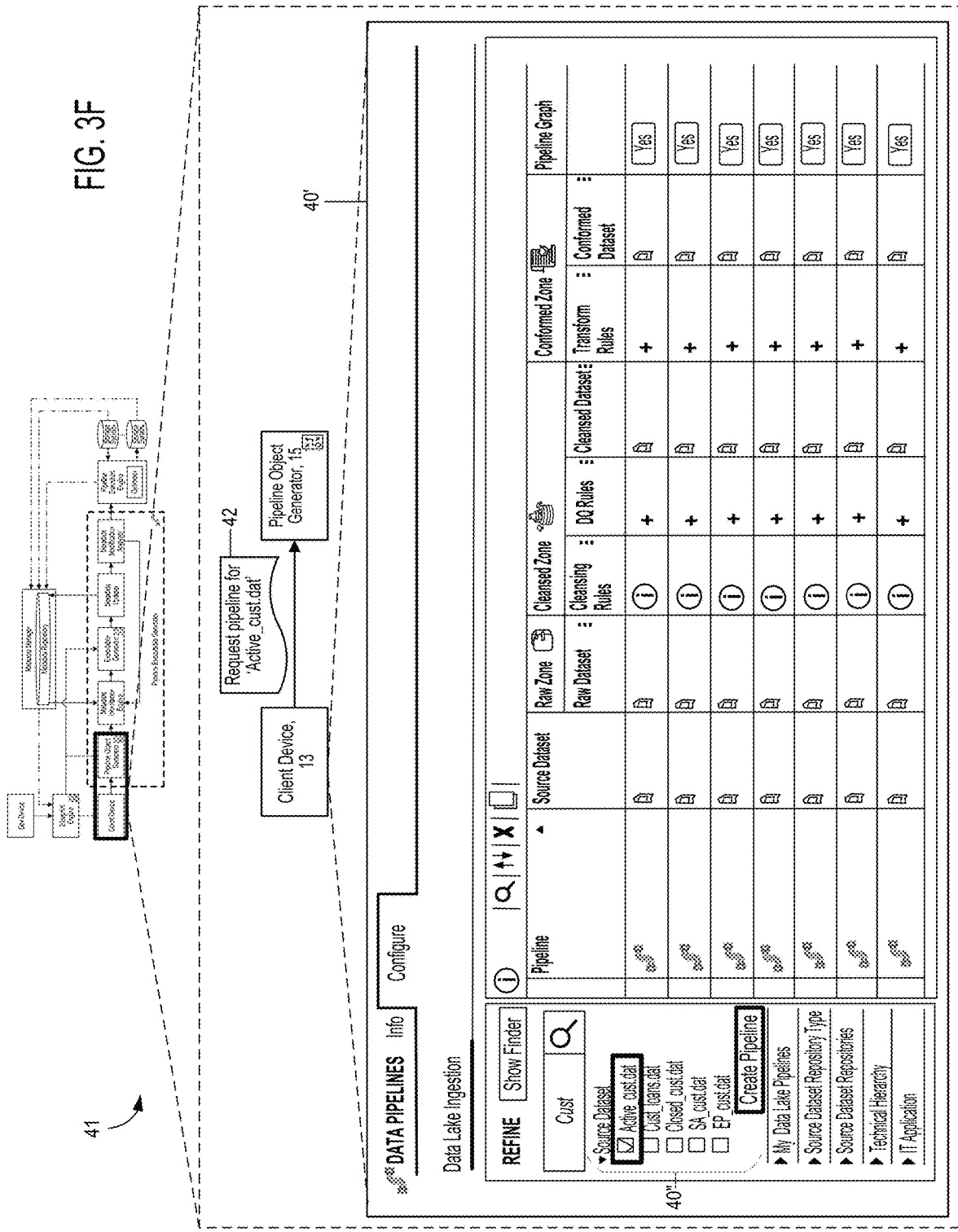

Referring to FIG. 3F, view 41 illustrates transmission of request 42 for pipeline from client device 13 to pipeline object generator 15. Client device 13 renders graphical user interface 40', which is a version of graphical user interface 40 in which the active customer dataset has been selected for ingestion. In this example, graphical user interface 40' includes portion 40", which displays the datasets that are candidates for ingestion. Blueprint engine 12 generates the data for portion 40" based on data 38*a* (FIG. 3D) that specifies the names of the datasets that are candidates for ingestion.

Figure 3G:
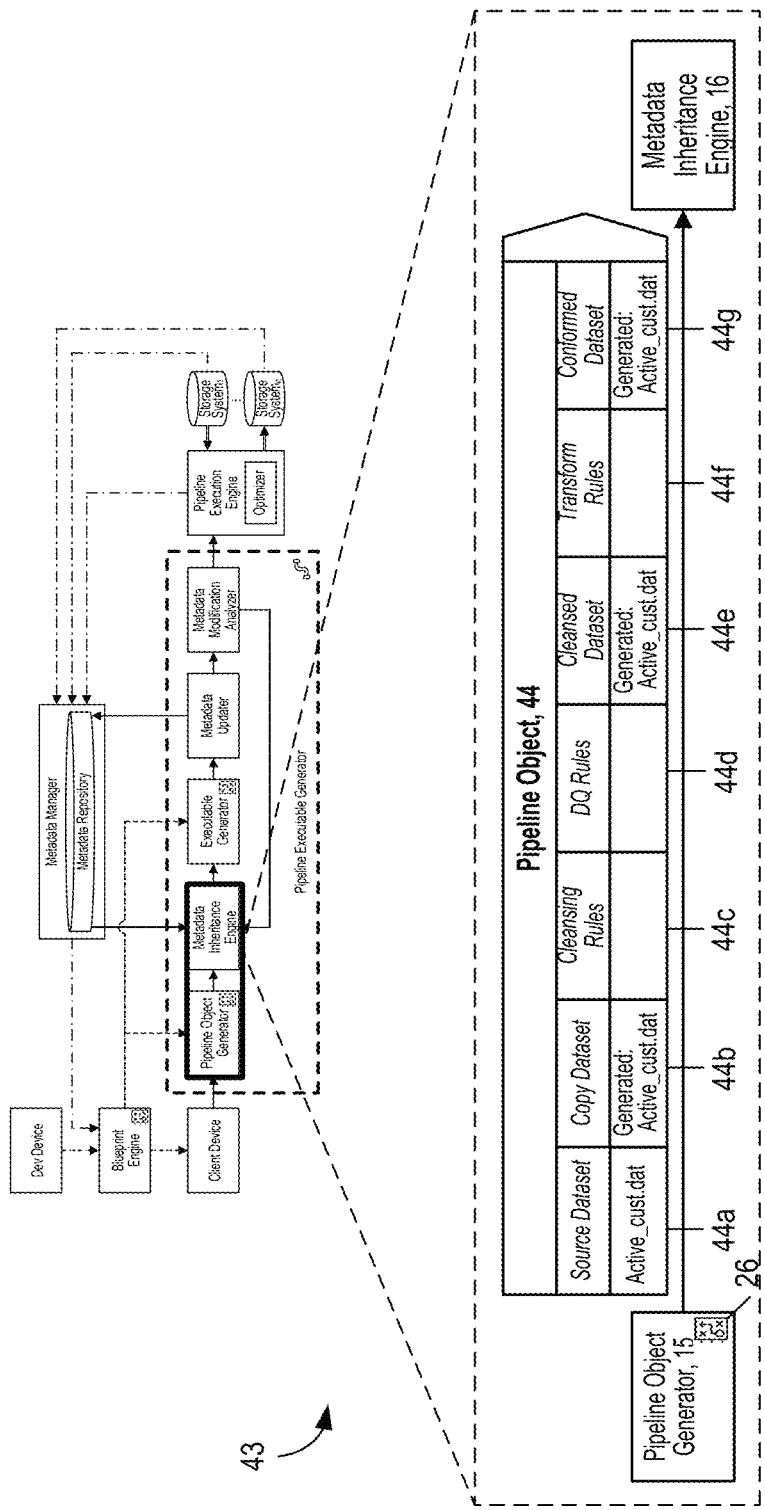

Referring to FIG. 3G, view 43 illustrates generation of pipeline object 44 and transmission of pipeline object 44 from pipeline object generator 15 to metadata inheritance engine 16. Responsive to request 42 (FIG. 3F), pipeline object generator 15 uses blueprint 26 to generate pipeline object 44, which includes a data structure specifying i) a functionality to be performed by pipeline execution engine 21 in processing data, and ii) attributes, characteristics or data values associated with that functionality. Pipeline object generator 15 generates pipeline object 44, e.g., as follows: pipeline object generator 15 reads each generation rule (as represented in portions 32*b*-32*h* of FIG. 3B), for each generation rule, pipeline object generator 15 assigns a portion of pipeline object to that rule. In this example, based on the generation rules (represented in portions 32*b*-32*h* of FIG. 3B), pipeline object generator 15 generates portions 44*a*-44*g*. Each portion specifies a functionality and data with regard to that functionality. For example, portion 44*a* specifies a functionality of read source dataset (shown as Source Dataset in FIG. 3F). The data associated with that functionality is "Active_cust.dat", included in request 42 (FIG. 3F). As such, portion 44*a* specifies to read Active_cust.dat. The functionality for each of the portions 44*a*-44*g* corresponds to the function of the generation rule—for which that portion is assigned. For each portion, the attributes of that portion are determined from input data, the generation rules themselves, metadata attribution and/or inheritance, amongst others. That is, the blueprint 26 defines the functionality specified in the pipeline object 44. Then, how that functionality is applied to a particular dataset to be ingested or processed is determined based on user input and metadata attribution and inheritance. In determining how the functionality is applied, pipeline executable generator 14 populates each of portions 44*a*-44*g* based on user input or metadata attribution and/or inheritance. For example, portion 44*a* is populated with "active_cust.dat"-based on user input in portion 40" (FIG. 3F).

In this example, pipeline object 44 specifies a source dataset functionality to be performed on that source dataset and resultant datasets. For example, in portion 44*a*, pipeline object 44 specifies that in this example, the source dataset is active_cust.dat. Portion 44*b* specifies that a raw dataset will be generated, based on the raw generation rule specified by portion 32*c* (FIG. 3B). This raw dataset will also be named Active_cust.dat. Portion 44*b* includes the word "generated" to specify that this raw (or copied dataset) is created because the generation rules specify that it must be created. As such, this raw dataset is generated. Generally, a raw dataset is a copy of a source dataset.

Portion 44*c* is for specifying the cleansing rules to be applied to the raw dataset. Portion 44*d* is for specifying data quality rules to be applied to the raw dataset. Portion 44*e* specifies the resultant dataset, which is the result from application of the cleansing and data quality rules, and is also named Active_cust.dat. Portion 44*f* specifies transform rules to be applied to the cleansed dataset. Portion 44*g* specifies a conformed dataset that is the result of application of the transformed rules to the cleansed dataset, and is also named Active_cust.dat.

As previously described, it is the blueprint itself that specifies that—for a particular source dataset—a raw dataset will first need to be generated and then cleansing and data quality rules may be applied as applicable. It is the blueprint itself that specifies that after the cleansing and data quality rules are applied, a new cleansed dataset is then generated and stored. Additionally, it is the blueprint itself that specifies that transformed rules will be applied, when specified. It is the blueprint that specifies that a new conformed dataset will be generated based on application of the transformed rules to the cleansed dataset. As described in the forgoing and subsequent figures, these portions of the pipeline object 44 will be populated as part of the process of ingesting the data. While this example is described with regard to pipeline ingestion of data, it will be understood to one of ordinary skill in the art that pipeline object 44 can be equally applicable to any system or functionality for modifying data, applying cleansing rules to it and conforming it, even data that is already internal within a system.

Figure 3H:
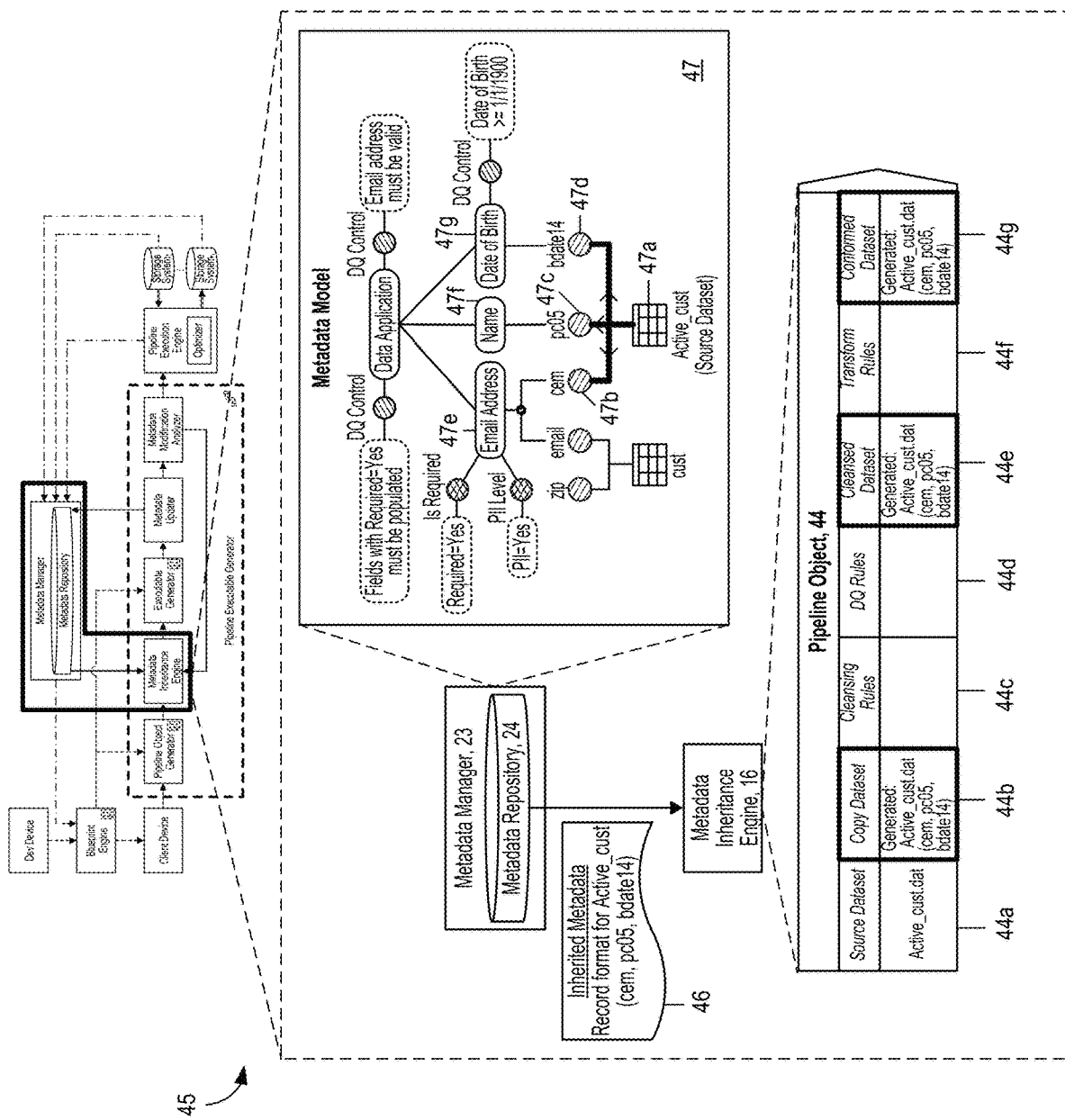
Figure 31:
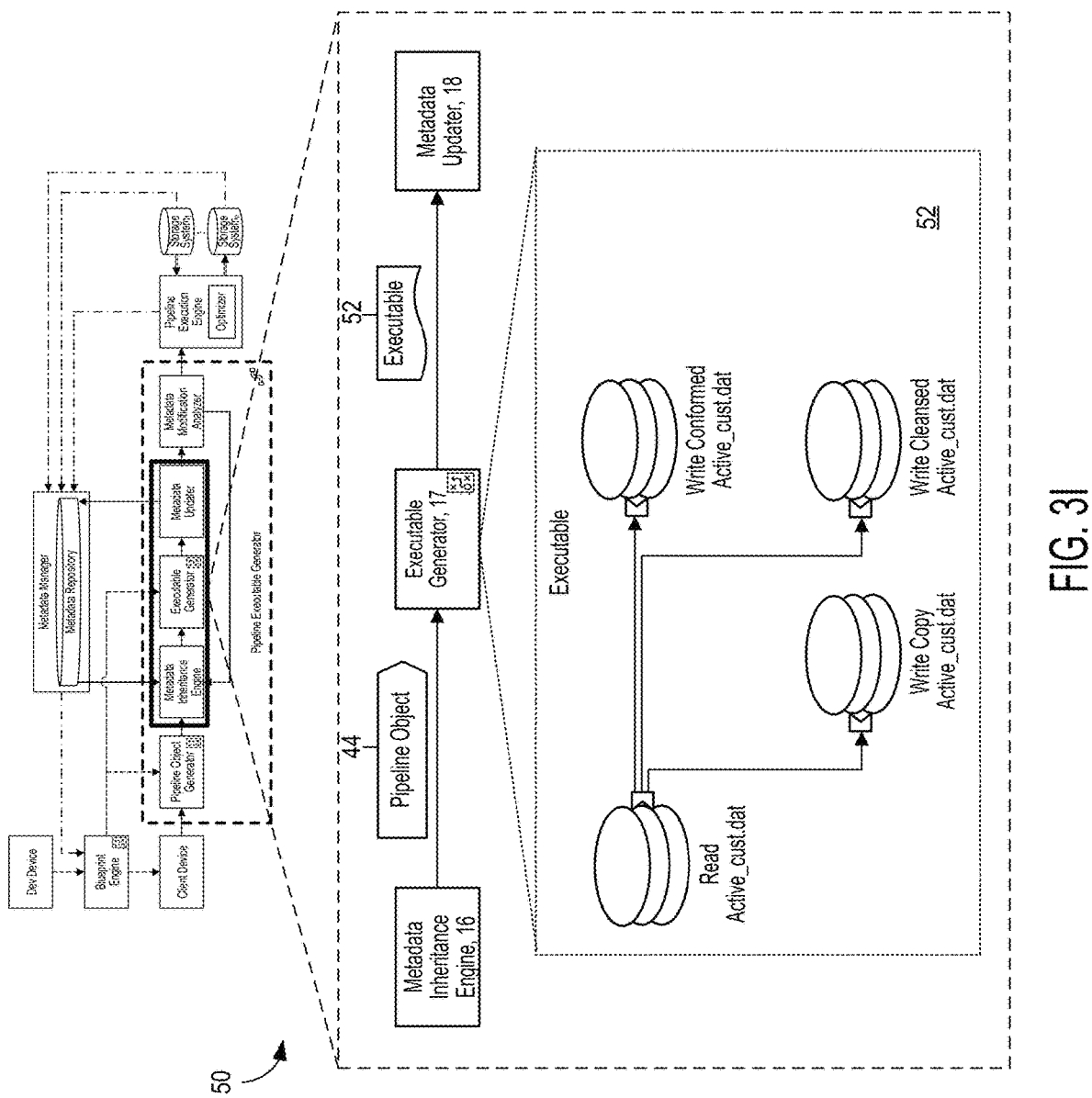

Referring to FIG. 3H, view 45 shows updating of pipeline object 44 based on metadata inheritance. In this example, metadata inheritance engine 16 receives pipeline object 44 and detects that portions 44*b*, 44*e*, 44*g* specify that new datasets will be created. As such, metadata inheritance engine 16 requests from metadata manger 23 a record format for the active_cust.dat dataset. Based on this request, metadata manager 23 traverses metadata model 47 and identifies node 47*a* representing the source dataset. Based on this, metadata manager 23 starts traversal of the metadata model 47 and goes up a layer to identify nodes 47*b*, 47*c* and 47*d*, which together represent the record format (e.g., field names and order) for active_cust.dat. The field names are cem, pc05, bdate14—each of which is an item of technical metadata. The business data elements (BDE)—such as Name—represent logical metadata, e.g., metadata that provides a semantic meaning for technical metadata. In generating a metadata model, semantic discovery may be applied on already stored or ingested fields, as described in U.S. patent application Ser. No. 16/794,361, titled "Discovering a Semantic Meaning of Data Fields from Profile Data of the Data Fields," the entire content of which is incorporated herein by reference.

In this example, metadata model 47 includes a number of layers with edges between the layers or nodes representing relationships among or between the nodes and layers.

Metadata manager 23 transmits inherited metadata 46 to metadata inheritance engine 16. Using inherited metadata 46, metadata inheritance engine 16 updates portions 44*b*, 44*e* and 44*g*. These updated portions 44*b*, 44*e*, 44*g* specify formats for these new datasets-a raw dataset, a cleansed dataset, a conformed dataset will each be generated as the data is being ingested into the system.

Additionally, in portion 44*b*, portion 44*e*, and portion 44*g* the word generated indicates that these datasets are being generated based on the generation rules of the blueprint. That is, the blueprint itself specifies that for each source dataset, that source dataset will be copied, it will be cleansed, and it will be conformed with each resultant dataset being landed in a raw zone (the raw dataset), a cleansed zone (the cleansed dataset), and a conformed zone (the conformed dataset).

Referring to FIG. 3I, view 50 illustrates generation of executable logic from pipeline object 44. In this example, metadata inheritance engine 16 transmits pipeline object 44 to executable generator 17. Based on pipeline object 44, executable generator 17 generates executable 52. Executable generator 17 may do so using the techniques described in U.S. patent application Ser. No. 15/795,917, titled "Transforming a Specification into a Persistent Computer Program," the entire content of which is incorporated herein by reference. In an example, executable generator 17 stores a template with a component to read a dataset and a component to write a dataset. Executable generator 17 also includes the logic needed to add additional components to the template, e.g., based on contents of pipeline object 44. These additional components include "Apply" components. Executable generator 17 is configured to add appropriate parameter values to each of the components (in generating a graph) based on values in pipeline object. For example, for a read component in the template, executable generator 17 updates that read component with a value of active_cust.dat, based on value in portion 44*a* (FIG. 3G) of pipeline object 44 (FIG. 3G). Additionally, as portions 44*c*, 44*d* and 44*f* are populated, executable generator 17 is configured to add components to the graph to perform the functionality specified in these portions and to update the added components with values specified in those portions.

Executable generator 17 transmits executable 52 to metadata updater 18. As described herein, metadata updater 18 will see if additional updates need to be made to the executable based on the fact that the executable itself is generating new datasets, which may in turn need to inherit attributes or rules based on the metadata model.

Figure 3J:
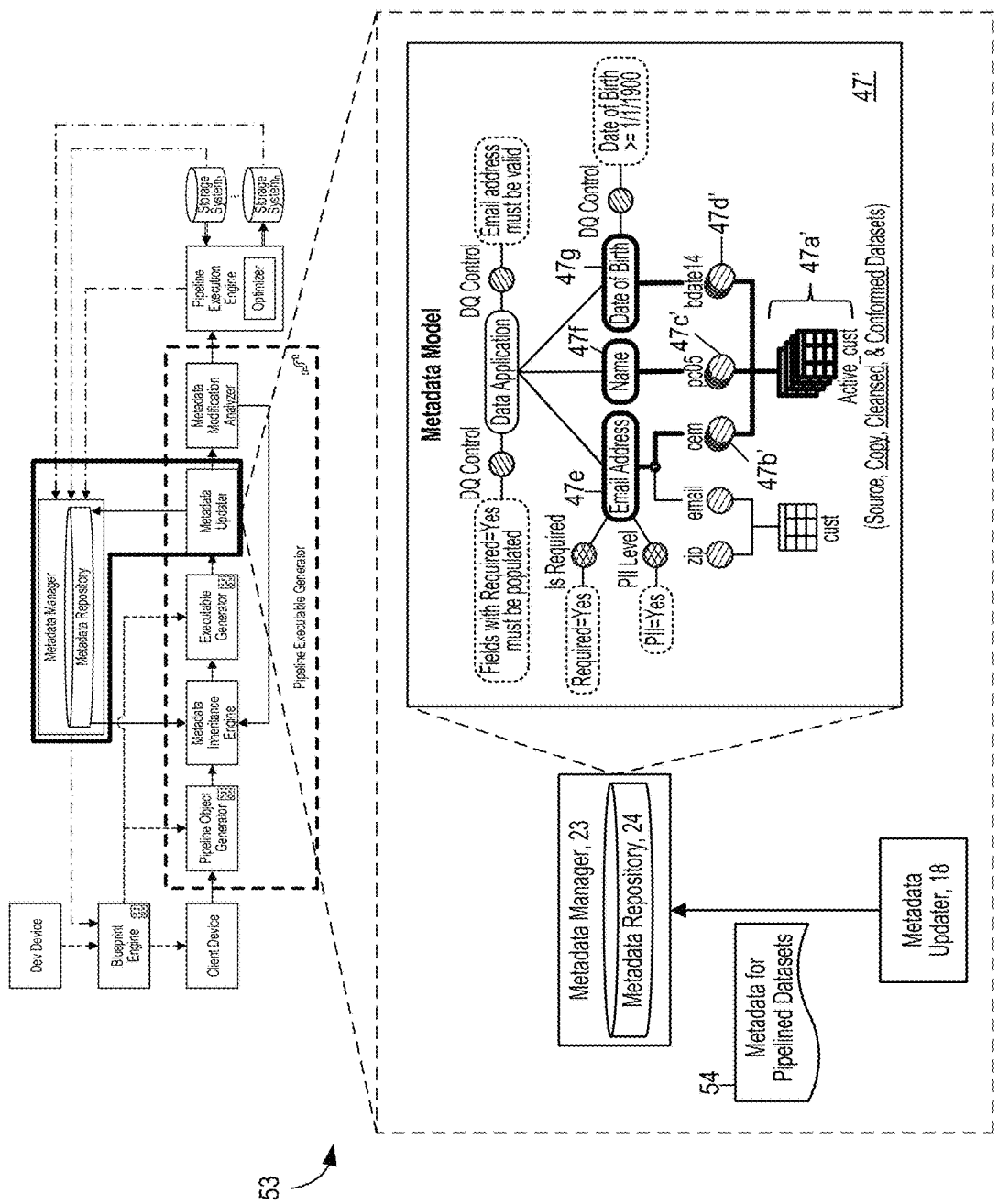

Referring to FIG. 3J, view 53 illustrates traversal of a metadata model for metadata and attribute inheritance. In this example, metadata updater 18 transmits metadata 54 for pipelined datasets to metadata manager 23. Metadata updater 18 identifies that the metadata manager 23 needs to be updated with new metadata by identifying in executable 52 (referenced in FIG. 3I) the fact that the read data is being written to three new datasets-conformed active_cust.dat, copy active_cust.dat, and cleansed active_cust.dat. Responsive to receipt of metadata 54, metadata manager 23 updates metadata model 47 with nodes representing a copy, cleanse and conform dataset, resulting in an updated metadata model 47'. This updated metadata model 47' includes nodes 47*a*' representing the source, copy, cleanse and conform datasets. Additionally, the metadata model 47 is updated with fields for each of the new datasets. In turn, each of these new fields are linked or otherwise associated with the business data elements to which the corresponding field of the source dataset were associated. In particular, metadata manager 23 generates new nodes 47*b*,' 47*c*', 47*d*'—each of which corresponds to nodes 47*b*, 47*c*, 47*d* for the source dataset. These new nodes, 47*b*', 47*c*', 47*d*' are associated in metadata model 47' with nodes 47*e*, 47*f*, 47*g*. As such, new datasets (e.g., copy, cleanse, and conform datasets) are now reflected in metadata model 47' and fields for each of these new datasets are also reflected in the metadata model 47', and the fields of these new datasets are also correctly linked to the appropriate business data elements. As such, for example, the cem field in the cleansed dataset is now appropriately linked to the email address business data element.

Figure 3K:
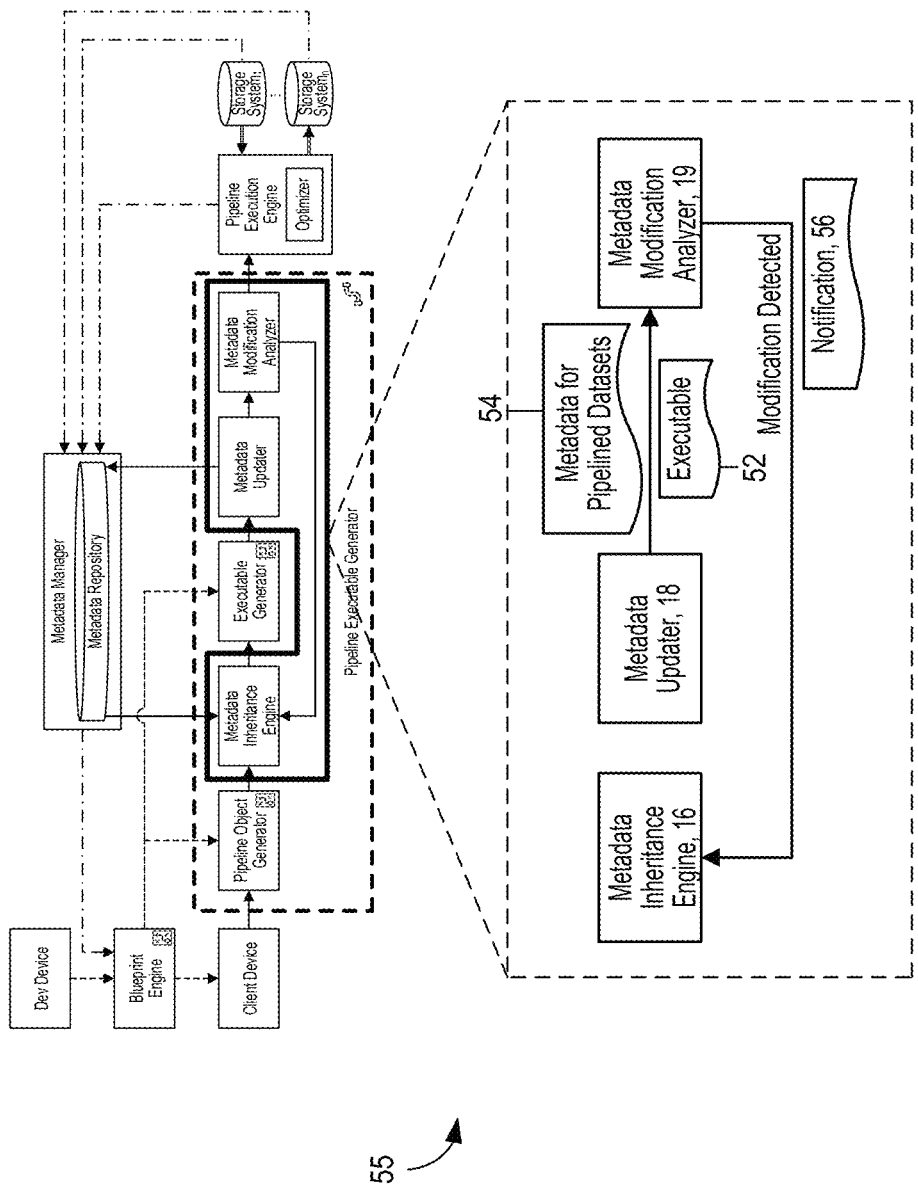

Referring to FIG. 3K, view 55 illustrates detection of new metadata, which in turn causes an iterative process in metadata inheritance. In this example, metadata updater 18 also sends metadata 54 to metadata modification analyzer 19. When metadata modification analyzer 19 receives metadata (such as metadata 54), metadata modification analyzer 19 identifies that there has been a change to the metadata in the metadata model 47. Once metadata modification analyzer 19 identifies that there is a change to the metadata in the metadata model 47, metadata modification analyzer 19 starts an iterative process of identifying if the new metadata in the metadata model needs to inherit any attributes, rules or controls from parent nodes. In this example, metadata modification analyzer 19 transmits to metadata inheritance engine 16 a notification 56 of the modified metadata. This notification 56 specifies the new data that is represented in the metadata model 47'. In this example, the new data is the copy, cleansed and conformed datasets 47*a*' and nodes 47*b*', 47*c*, 47*d*' that are represented in the metadata model 47'.

Figure 3L:
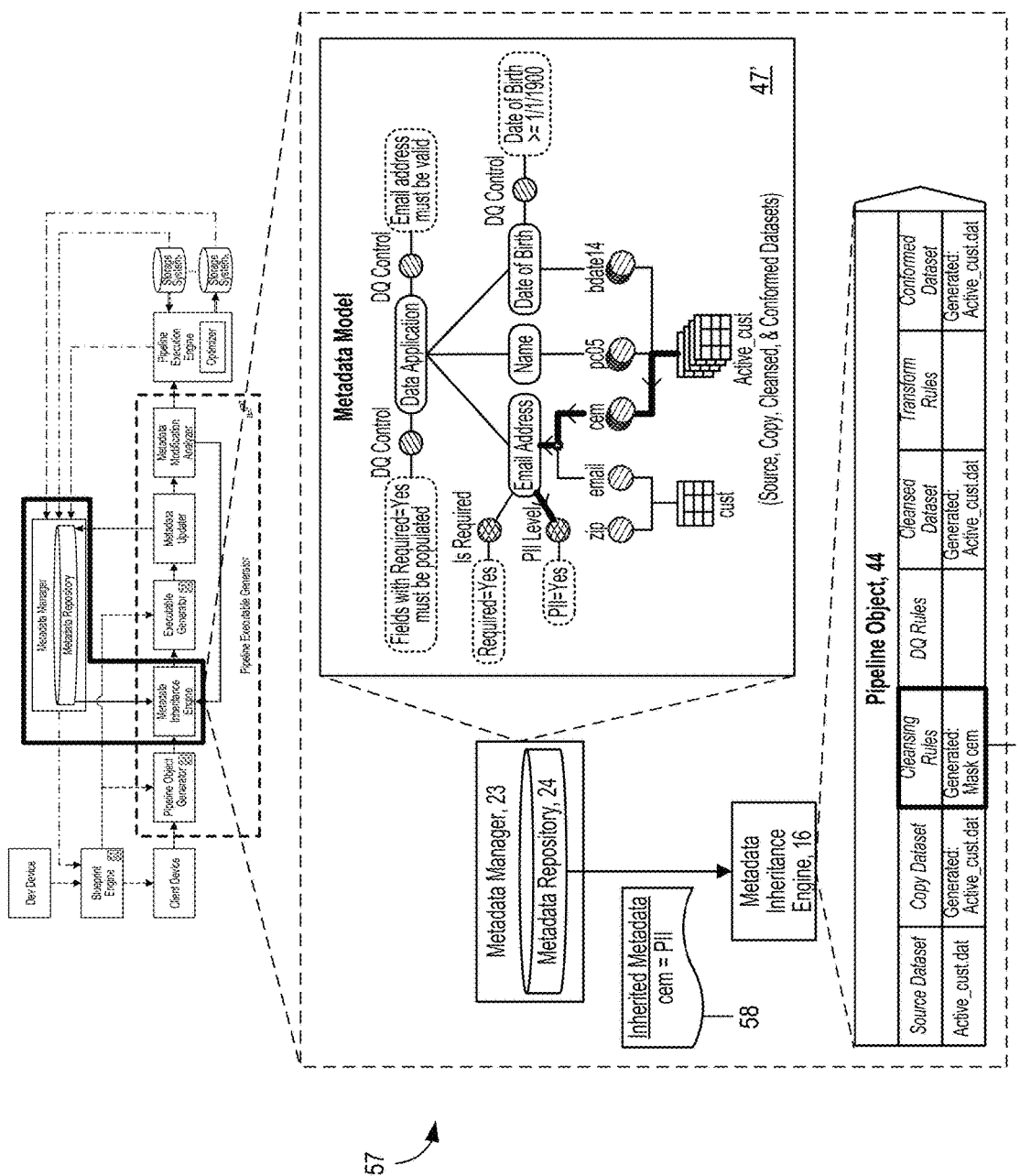

Referring to FIG. 3L, view 57 illustrates metadata inheritance engine 16 starting the process of identifying if the nodes in metadata model 47' that represent the fields of the copy, cleansed and conformed datasets need to inherit any data quality controls or any PII levels. In this example, metadata manager 23 traverses metadata model 47' to identify that the cem field (of each of the copy, cleansed and conformed datasets) is associated with the email address node, which in turn is associated with a PII level node. Based on this identification of inherited metadata, metadata manager 23 transmits inherited metadata 58 to metadata inheritance engine 16. Inherited metadata 58 specifies that cem=PII. In turn, metadata inheritance engine 16 updates pipeline object 44 by specifying in portion 44*c* "mask cem." In this example, the blueprint itself is specified to mask PII. In this case, metadata inheritance engine 16 has identified that the field labeled "cem" is PII. As such, metadata inheritance engine 16 specifies that the cleansing rule is "mask cem." Additionally, portion 44*c* specifies it is generated to indicate that this cleansing rule is based on application of the generation rules, which in turn are based on traversal of the metadata model 47' to identify which fields are PII.

Figure 3M:
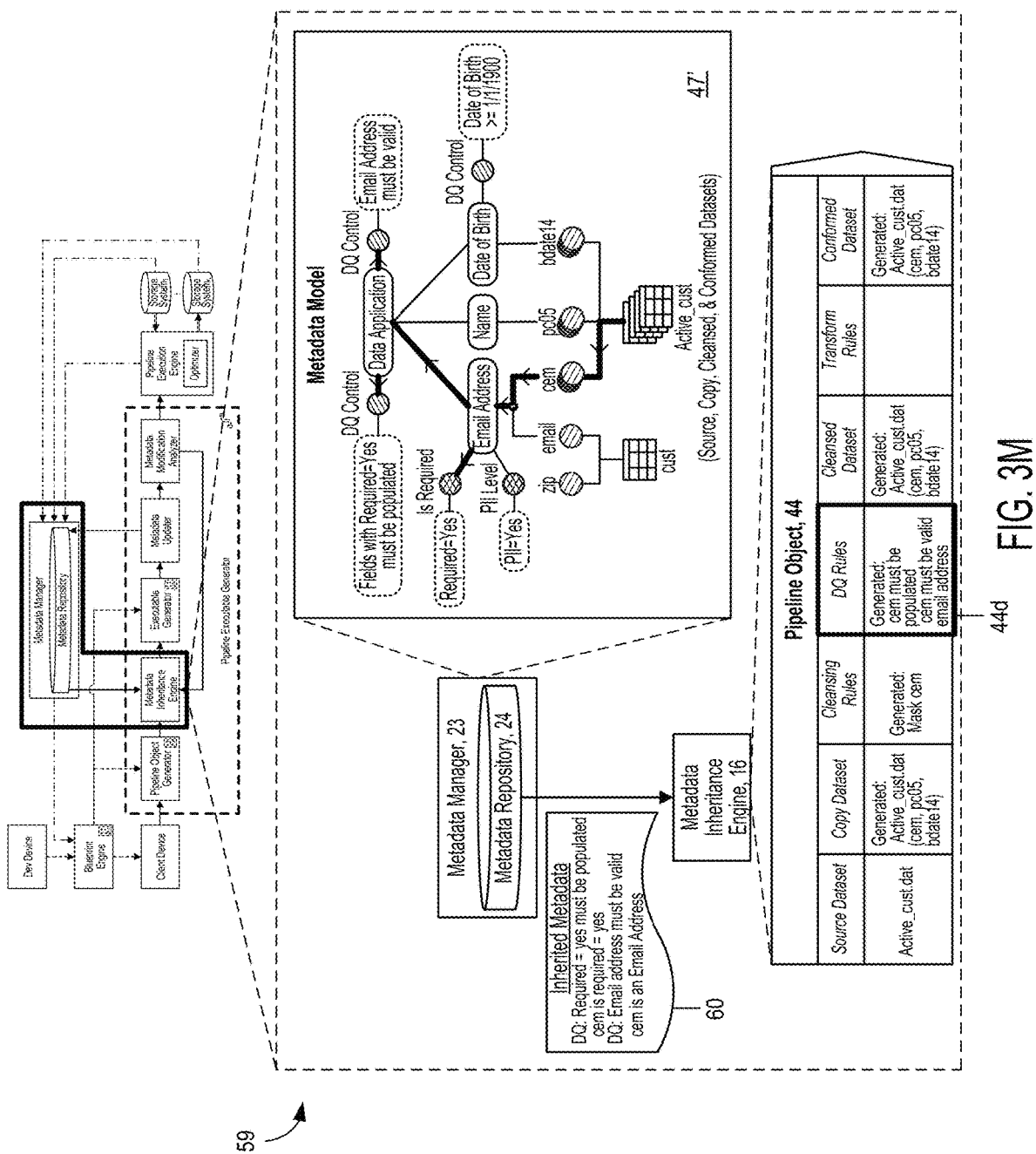

Referring to FIG. 3M, view 59 illustrates additional traversal of metadata model 47'. In addition to inheriting metadata 58, metadata inheritance engine 16 also inherits metadata 60 based on further traversal of metadata model 47' by metadata manager 23. In this example, metadata manager 23 identifies that the node representing a business name of email address is associated with a control specifying that email address is a required field, which in turn is associated with the data application node, which in turn is associated with two data quality controls specifying that fields with required-yes must be populated and that the email address must be valid. As such, metadata manager 23 identifies that each of the cem fields in the copy, cleansed and conformed datasets must be populated and must have a valid email address. This information is specified in inherited metadata 60. Metadata inheritance engine 16 updates portion 44*d* of pipeline object 44 with the information specified in inherited metadata 60.

Figure 3N:
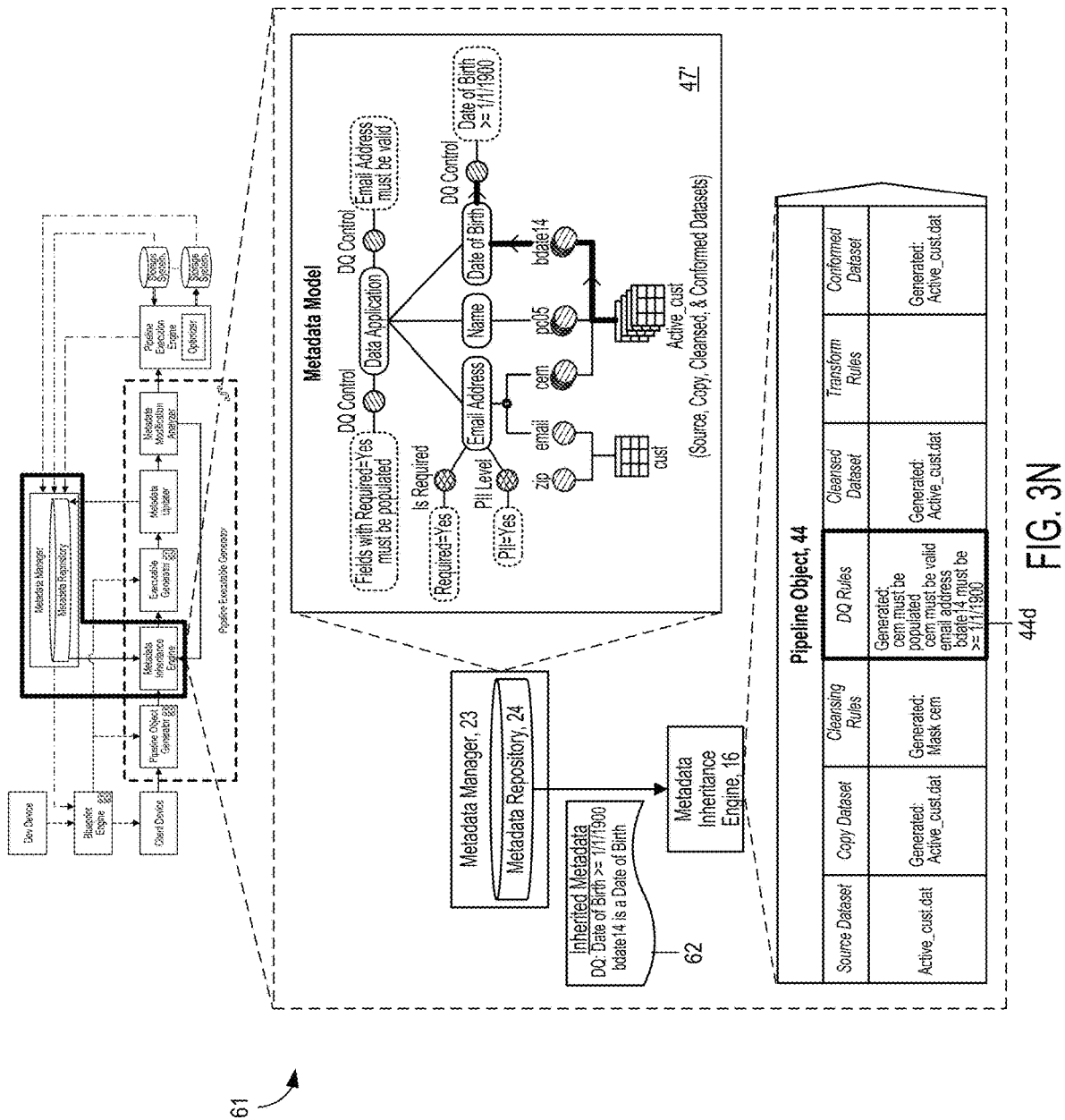
Figure 30:
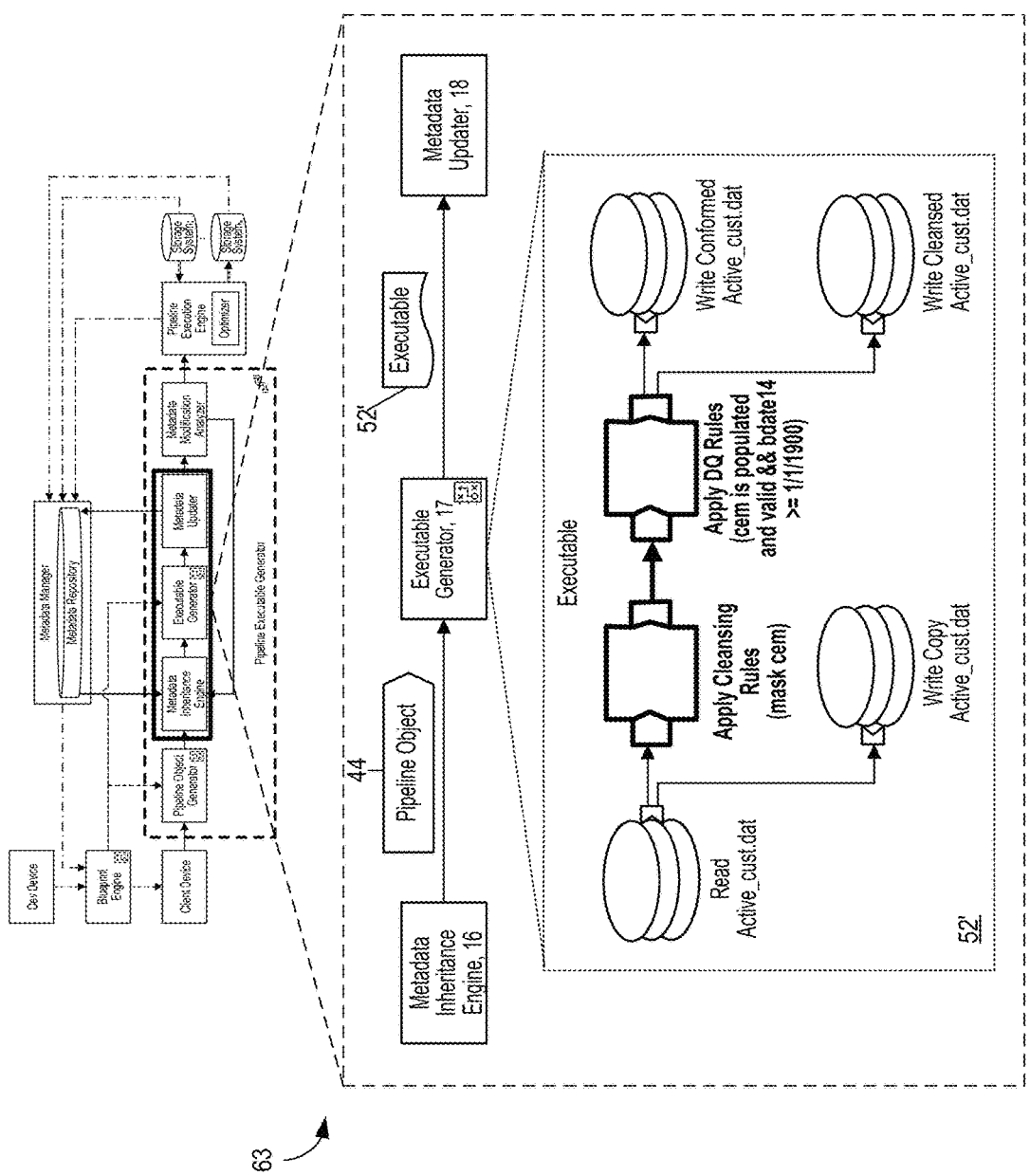

Referring to FIG. 3N, view 61 illustrates additional traversal of metadata model 47'. In this example, metadata model specifies that bdate field of each of the copy, cleansed and conformed datasets is associated with the business data element of date of birth, which in turn is associated with a control specifying that the date of birth must be before or equal to Jan. 1, 1900. Based on this traversal and identification of a data quality control for the bdate field, metadata manager 23 generates inherited metadata 62 and transmits it to metadata inheritance engine 16. Responsive to receipt of inherited metadata 62, metadata inheritance engine 16 further updates portion 44*d*.

Referring to FIG. 3O, view 63 illustrates updating of executable 52 based on the updated pipeline object 44, which—in turn—is updated by identifying linkages in the metadata model 47' among newly added data in the metadata model and related nodes in the metadata model 47'. That is, for example, new data may be added to the metadata model 47 by adding a new node and then linking that node to a node in a layer that is above a layer of the newly added node. However, that linkage is not reflected in the executable 52, until the pipeline object 44 is updated in accordance with that linkage, which—in turn—causes an updating of the executable 52. In this example, executable 52 is updated with components specifying that the cleansing rules are to be applied to "mask cem" and specifying that the data quality rules are to be applied (as specified in portion 44d of FIG. 3M), resulting in executable 52'—which is a version of executable 52. Executable generator 17 transmits executable 52' to metadata updater 18.

Figure 3P:
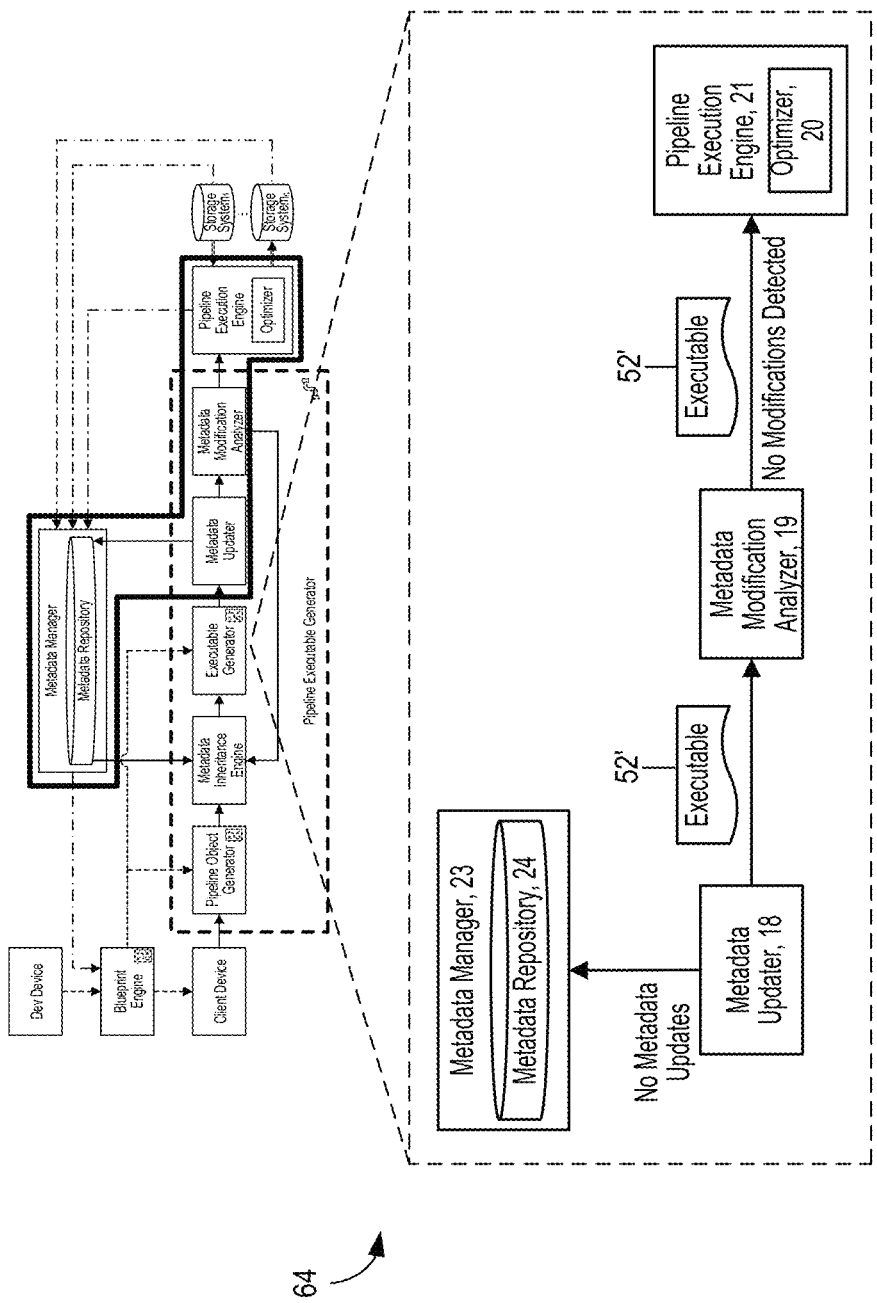

Referring to FIG. 3P, view 64 illustrates receipt of executable 52' by pipeline execution engine 21. In this example, metadata updater 18 detects in executable 52' that there is no modification of the metadata in metadata model 47'. As such, metadata updater 18 transmits executable 52' to metadata modification analyzer 19. Metadata modification analyzer 19 transmits executable 52' pipeline execution engine 21. Metadata modification analyzer 19 does not receive from metadata updater 18 additional metadata for pipelined datasets. As such, metadata modification analyzer 19 determines that there are no modifications to the metadata model.

Figure 3Q:
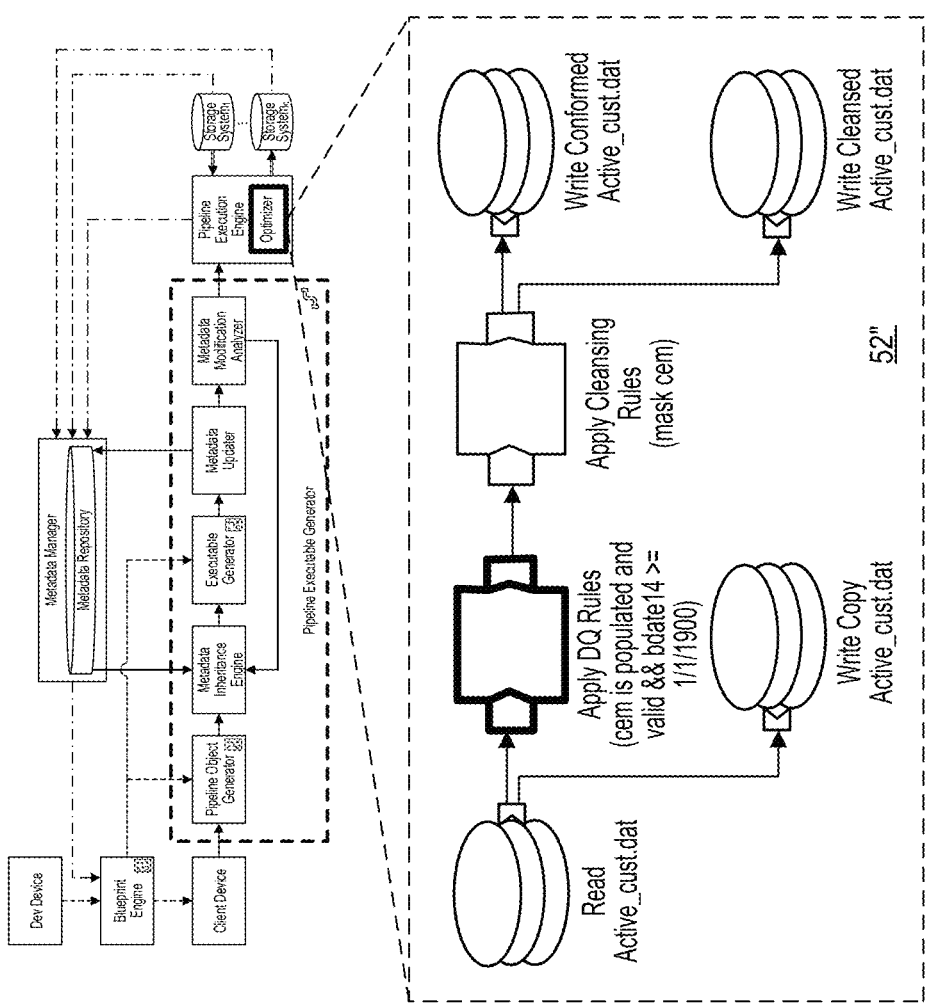

Referring to FIG. 3Q, optimizer 20 generates executable 52", which is a version of executable 52'. In executable 52", the component for applying data quality rules is moved to come before the component for applying cleansing rules. Optimizer 20 performs this move for increased processing efficiency. This is because it is inefficient to mask an email address if that email address is not even valid.

Figure 3R:
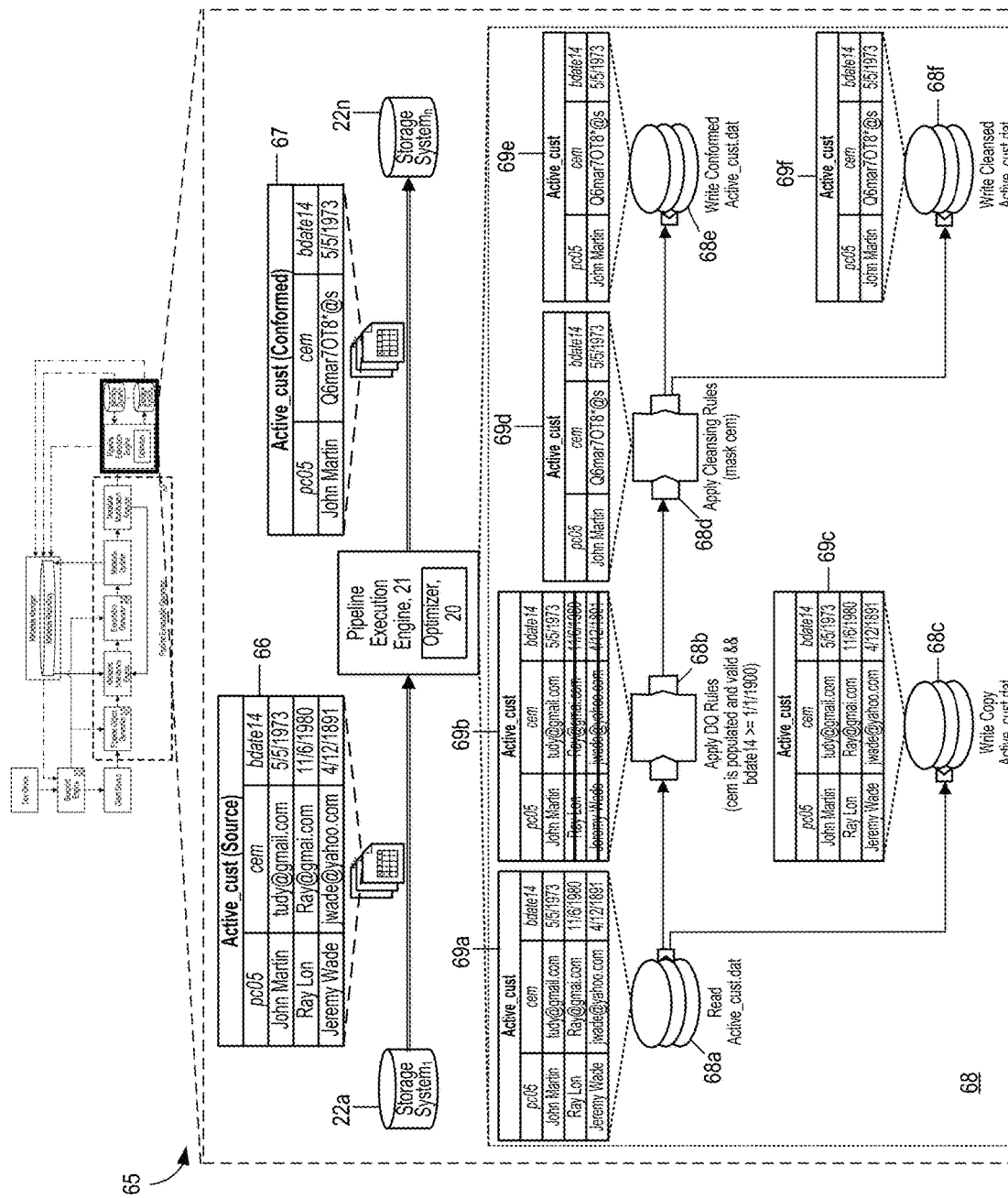

Referring to FIG. 3R, view 65 shows real-time ingestion of data using executable 52". In this example, storage system 22a transmits source dataset 66 to pipeline execution engine 21. Pipeline execution engine 21 executes executable 52". View 68 shows resultant data that results from execution of each component in executable 52" View 68 illustrates that data 69a results from execution of component 68a. Data 69b results from execution of component 68b. Data 69c results from execution of component 68c. Data 69d results from execution of component 68d. Data 69e results from execution of component 68e. Data 69f results from execution of component 68f. Following execution of executable 52", pipeline execution engine 21 outputs dataset 67 to storage system 22n.

Figure 3S:
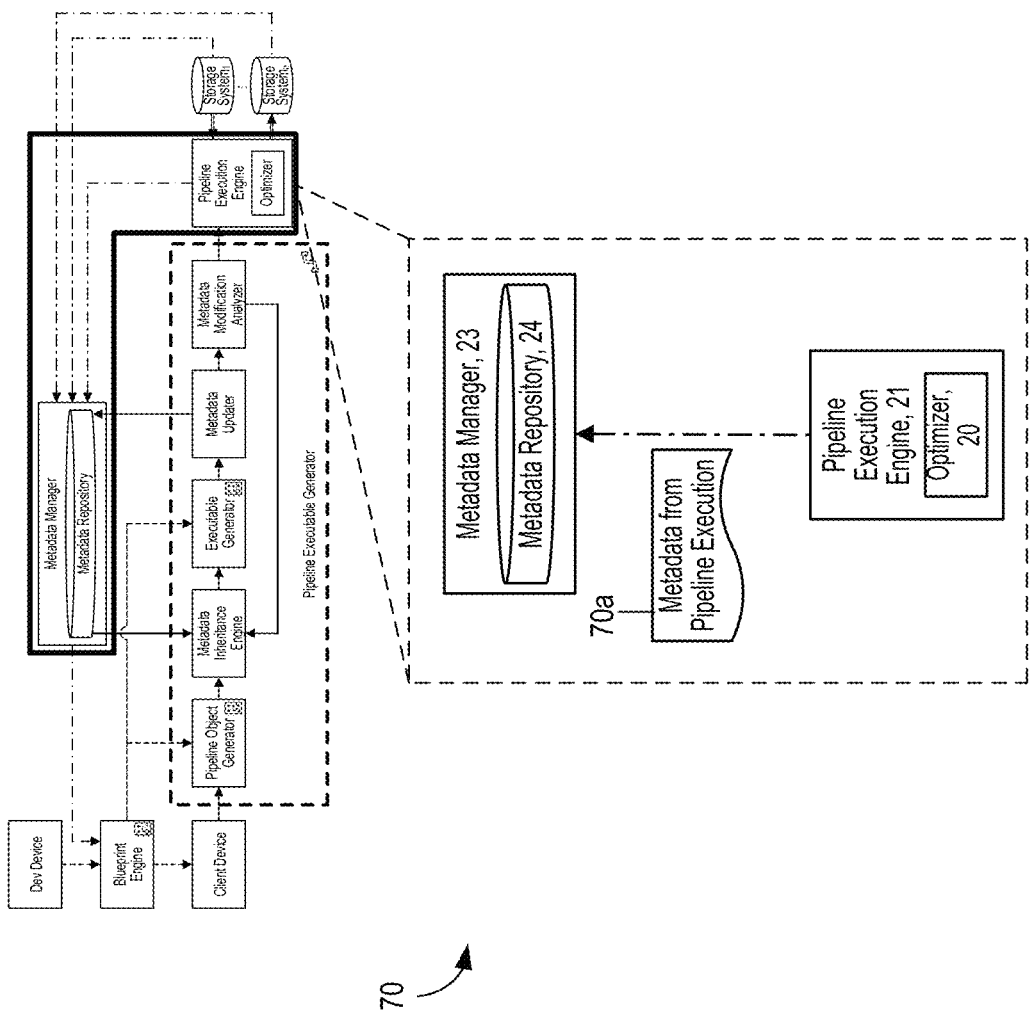

Referring to FIG. 3S, view 70 illustrates storing of metadata 70a that results from execution of executable 52" by pipeline execution engine 21. In this example, metadata 70a specifies, for example, which datasets have been generated, which components have been successfully run and it also specifies, for example, where the resultant actual conformed, and/or cleansed data is being stored. In some examples, metadata 70a specifies data quality results from execution of executable 52" by pipeline execution engine 21.

Figure 4A:
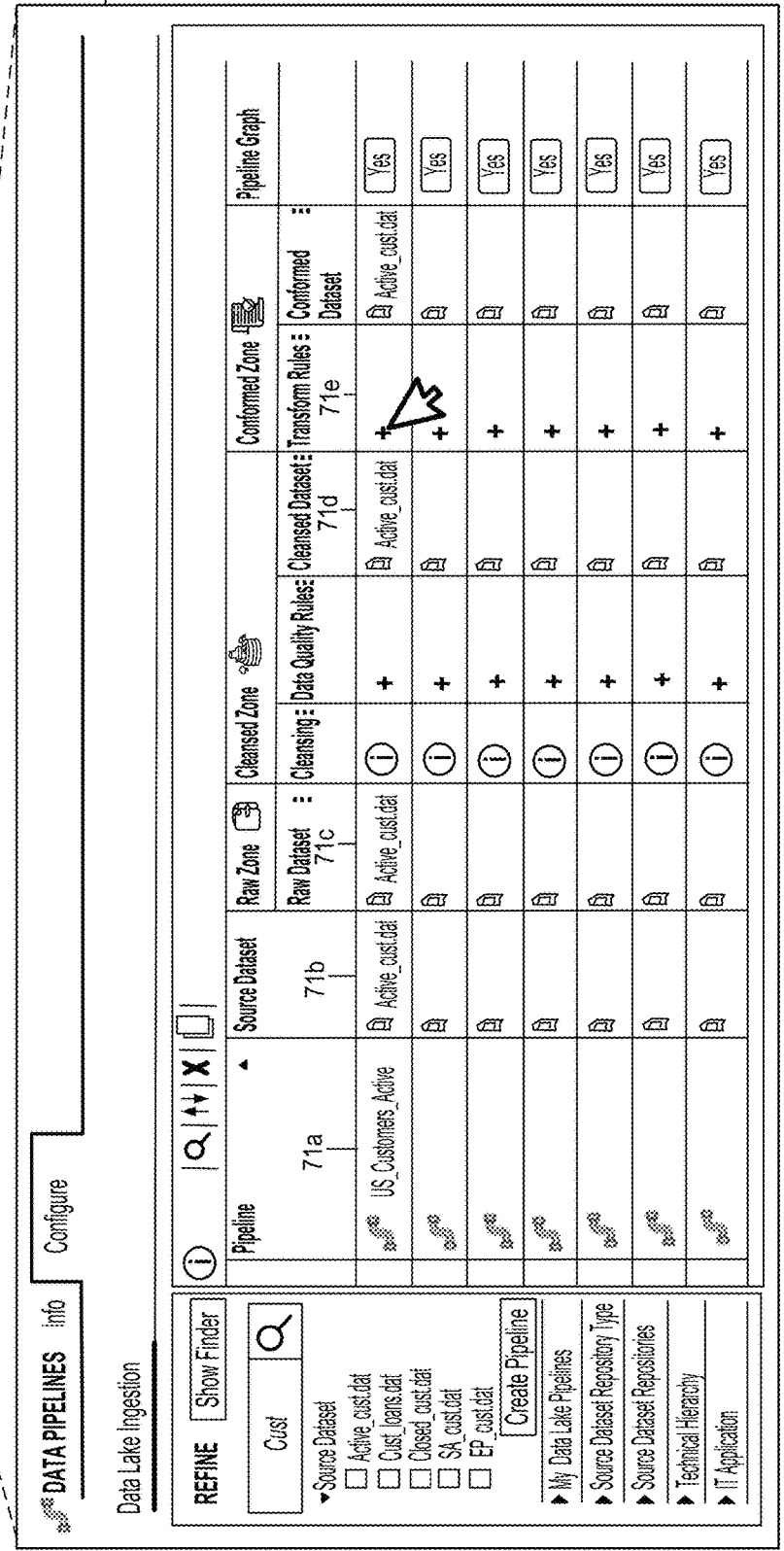
FIGS. 4A-4G are diagrams illustrating the addition of transform rules to a data pipeline.

Referring to FIG. 4A, graphical user interface 71 includes cells 71a-71e, which respectively illustrate the name of a pipeline, the name of the source dataset, the name of the raw dataset, the name of the cleansed dataset, and an icon for specifying transformation rules. Cell 71d also specifies the name of the conformed dataset.

Figure 4B:
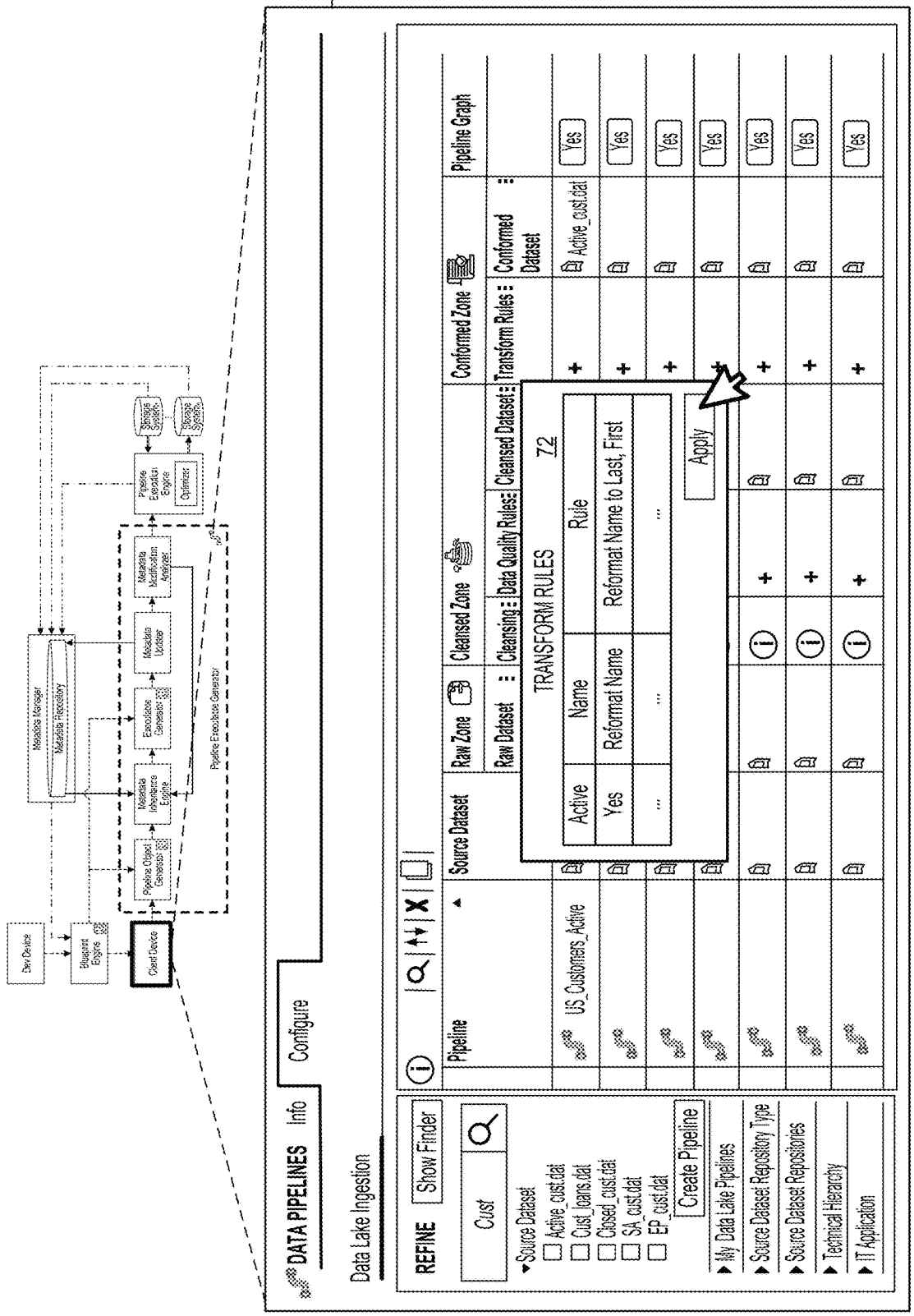

Referring to FIG. 4B, overlay 72 is displayed juxtaposed to or over graphical user interface 71, for example, upon selection of the plus icon represented in portion or cell 71e (referenced in FIG. 4A). Overlay 72 enables a user to input transform rules to be applied during the ingestion process and to apply those rules. Generally, ingestion refers to retrieving data from one or more data sources, and performing one or more actions on that data prior to either outputting the data or storing the data.

Figure 4C:
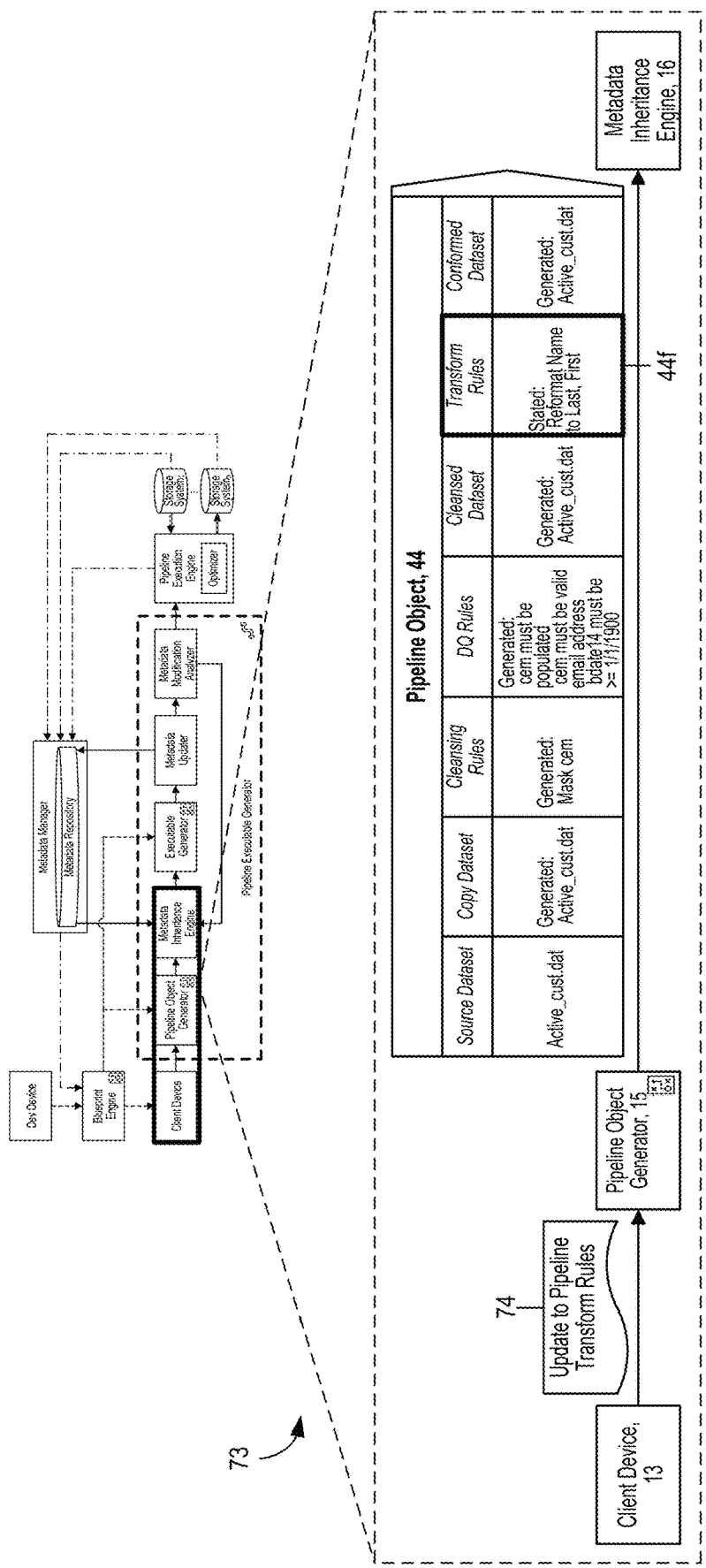

Referring to FIG. 4C, view 73 illustrates updating a pipeline object based on the transformation rules, input or otherwise stated in overlay 72. In this example, client device 13 sends update 74 to pipeline object generator 15. Update 74 specifies the transformation rules that are input or otherwise stated in overlay 72. Responsive to receiving update 74, pipeline object generator 15 updates portion 44f to indicate that there is a transformation rule of reformatting a name to the format: last name, first name. In this example, portion 44f includes the verbiage "stated," to reflect the fact that this transformation rule is stated, or otherwise input into the system, rather than being based on the generation rules that are part of the blueprint.

Figure 4D:
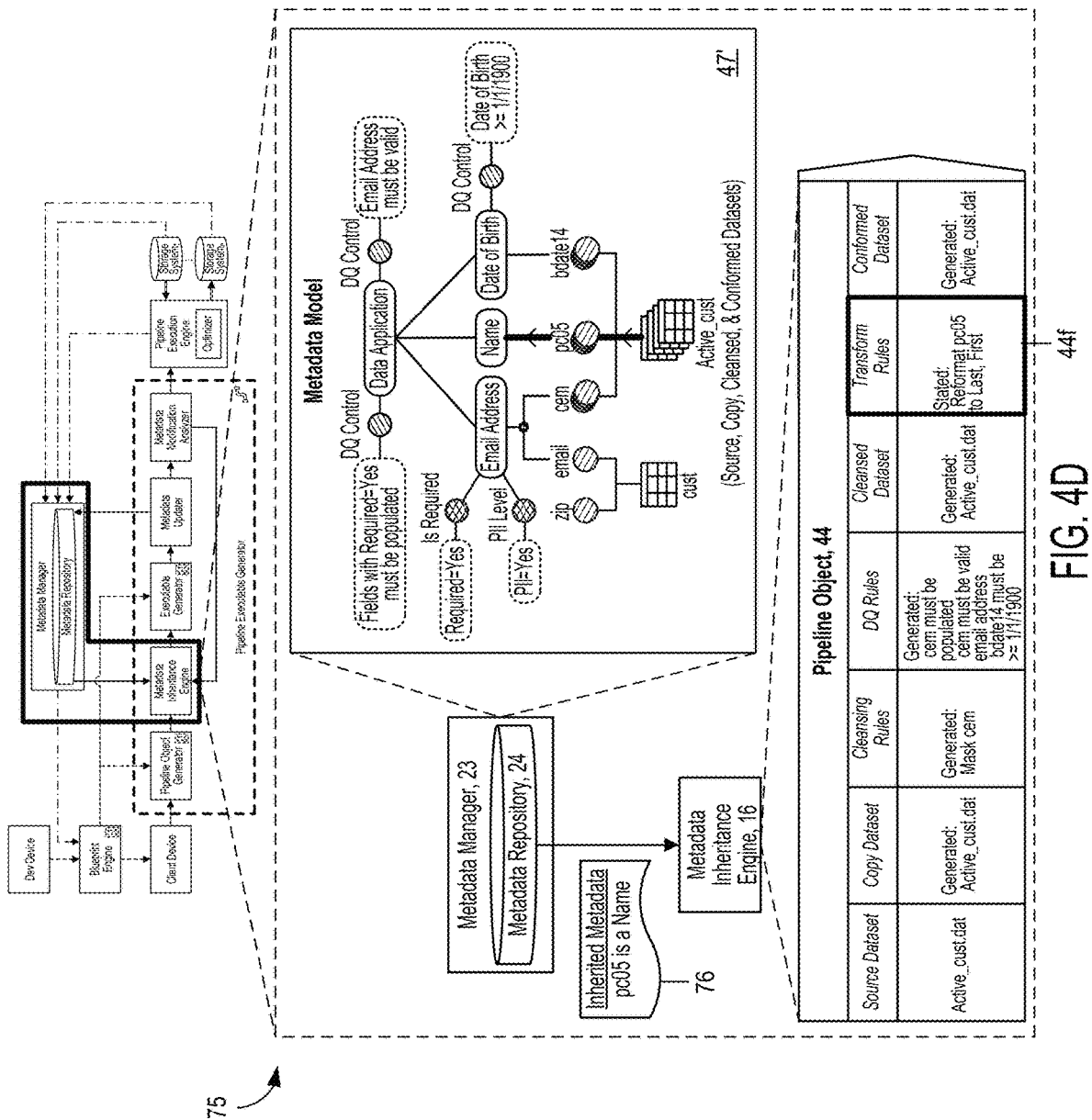

Referring to FIG. 4D, view 75 illustrates traversal of the metadata model 47' in further generation of the transformation rules. In this example, metadata inheritance engine 16 transmits to metadata manager 23 a request for which one or more fields are associated with a business data element of "Name." In response, metadata manager 23 traverses metadata model 47' to identify that field pc05 is associated with the business data element of "Name." As such, metadata manager 23 transmits inherited metadata 76 to metadata inheritance engine 16. Metadata inheritance engine 16 updates portion 44f to specify the field name that is actually being reformatted.

Figure 4E:
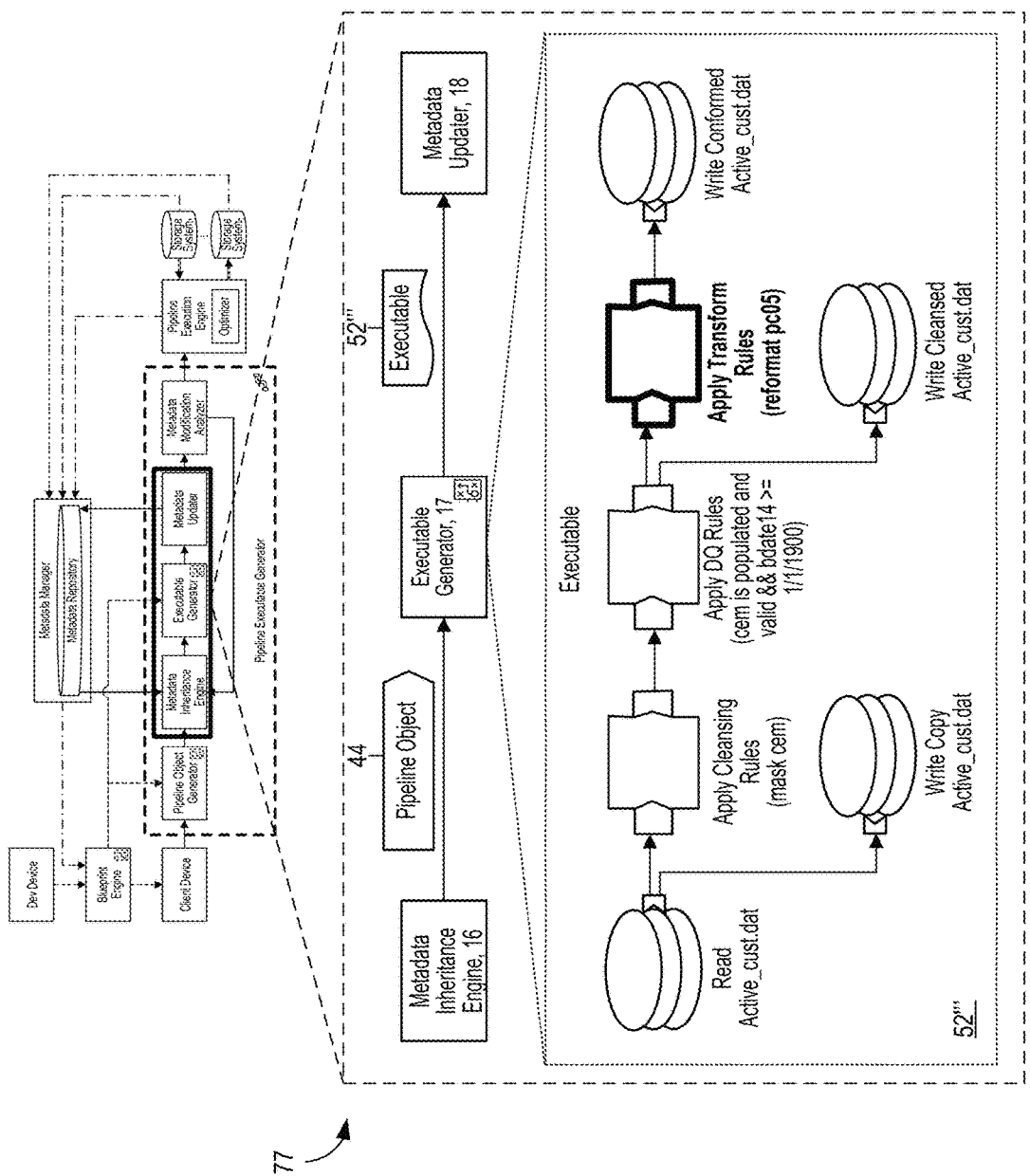

Referring to FIG. 4E, view 77 illustrates an update to executable 52" in accordance with the transformation rule specified in portion 44f of pipeline object 44. Executable generator 17 generates executable 52''' and transmits executable 52''' to metadata updater 18.

Figure 4F:
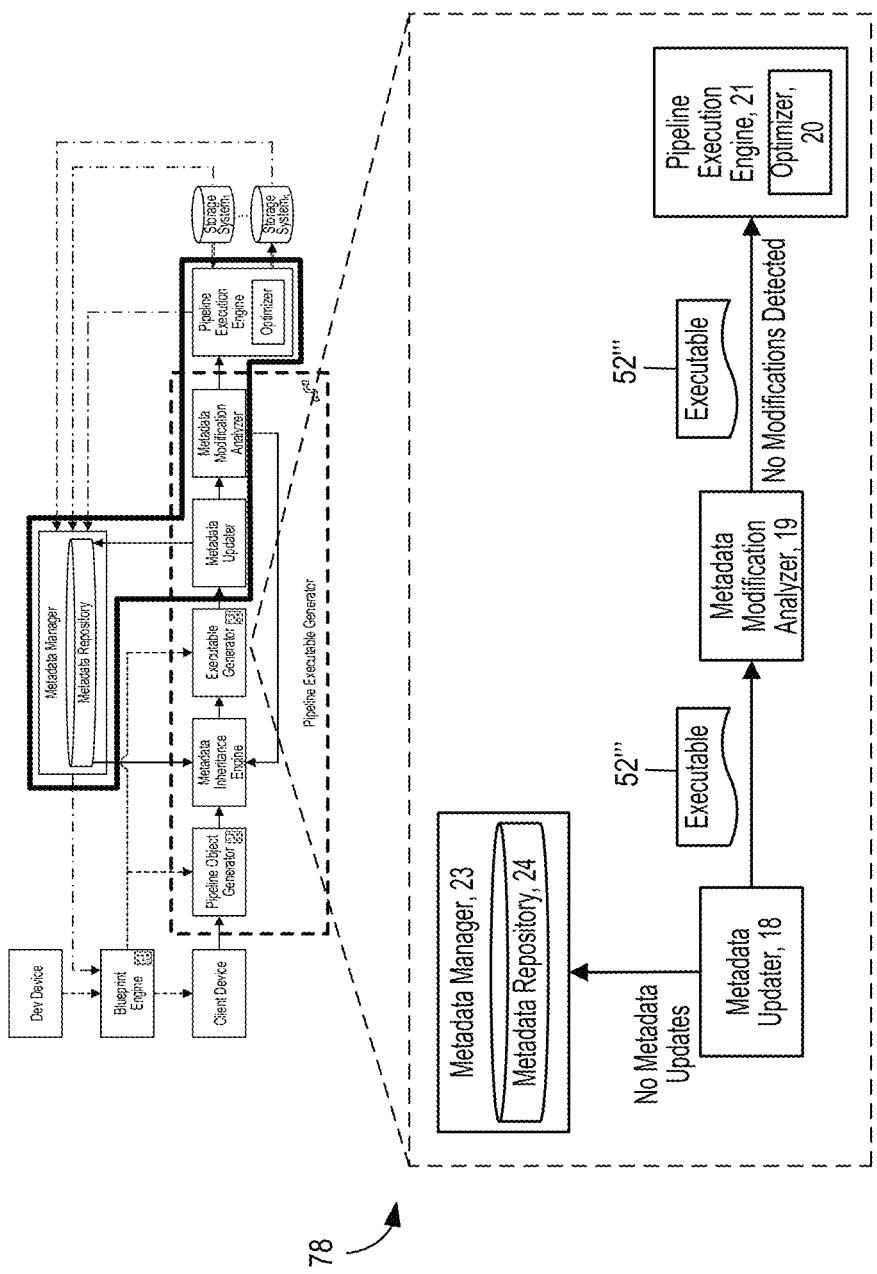

Referring to FIG. 4F, view 78 illustrates the transmission of executable 52'''' to pipeline execution engine 21. In this example, metadata updater 18 transmits executable 52''' to metadata modification analyzer 19. Metadata modification analyzer 19 detects that there are no modifications to metadata model, at least because metadata modification analyzer 19 has not received from metadata updater 18 an indication of those modifications. As such, metadata modification analyzer 19 transmits executable 52''' to pipeline execution engine 21. In this example, metadata modification analyzer 19 determines that because there are no further updates to the metadata model, there is no additional reason to determine whether attributes and/or data quality rules need to be inherited by those new metadata items.

Figure 4G:
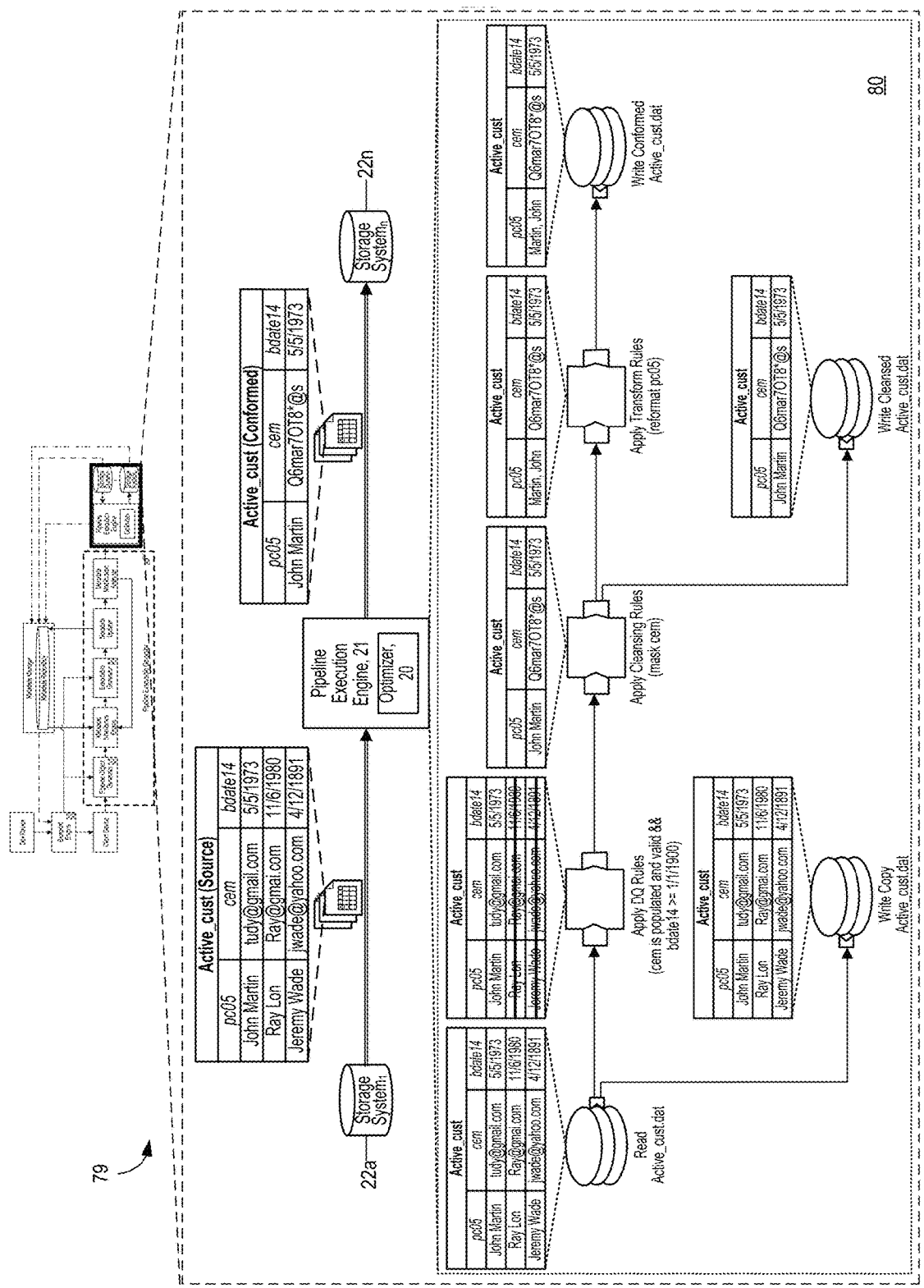

Referring to FIG. 4G, view 79 illustrates execution of executable 52'''. In this example, executable 52" includes the update of applying the transformation rules. View 80 illustrates data that results from execution of each component in executable 52'''.

Figure 5A:
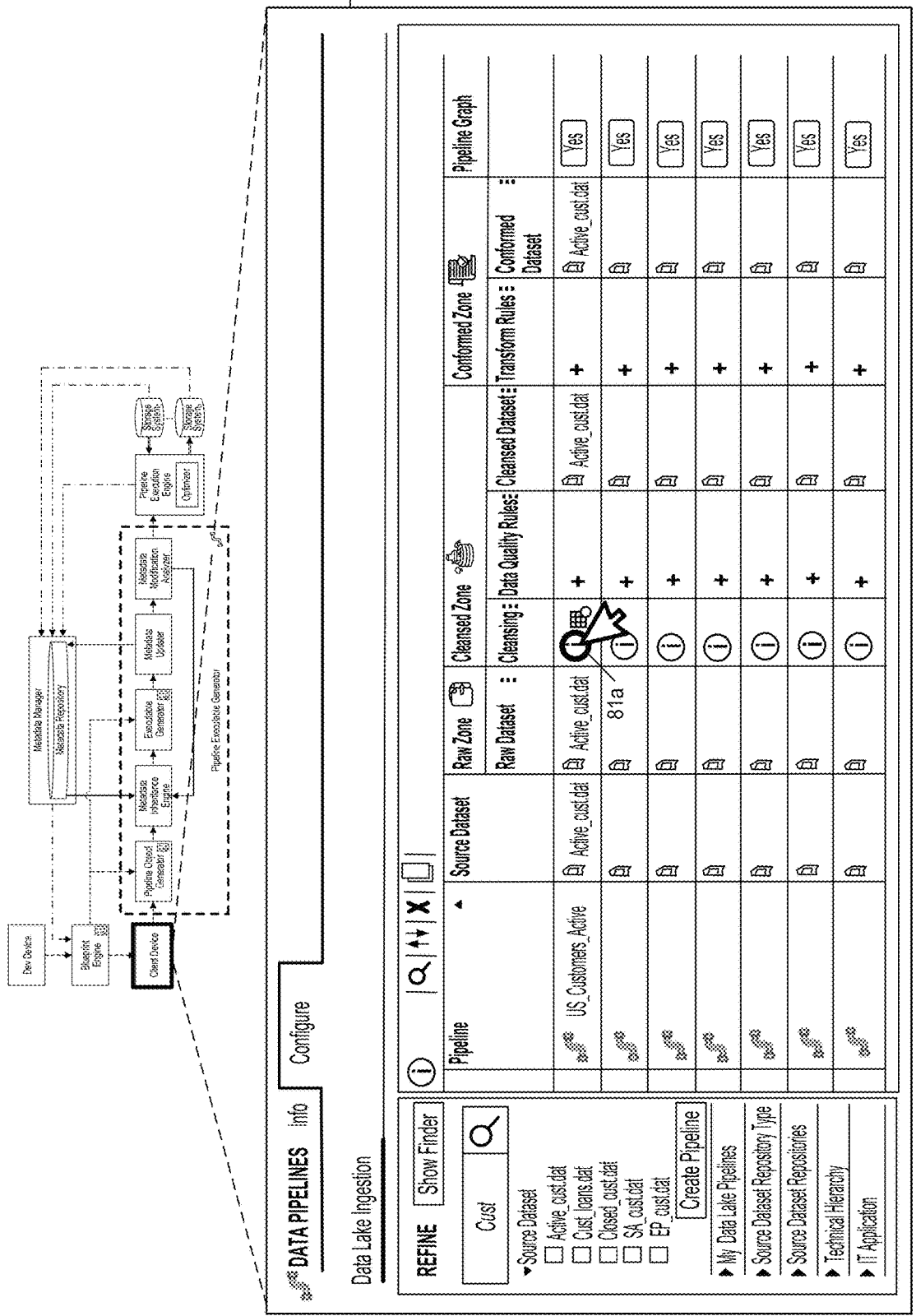

Referring to FIG. 5A, graphical user interface 81 enables a user to view the cleansing rules that are being applied to a particular dataset for selection of icon in cell 81a. In this example, the name of the pipeline is US_customers_active. Generally, a pipeline refers to the ultimate dataset that is cleansed, conformed and/or transformed and saved into a specified storage system. In another example, a pipeline generally refers to a name that is given or assigned to a series of actions or tasks for retrieving data, performing specified cleanse, conform, and/or transformation rules to that data. That is, the name of the pipeline refers to the name of the process for creating the data is ultimately cleansed and conformed.

Referring to FIG. 5B, overlay 82 is shown on graphical user interface 81. Overlay 82 displays the cleansing rules that are applied to the source dataset of active_cust.dat.

Figure 5C:
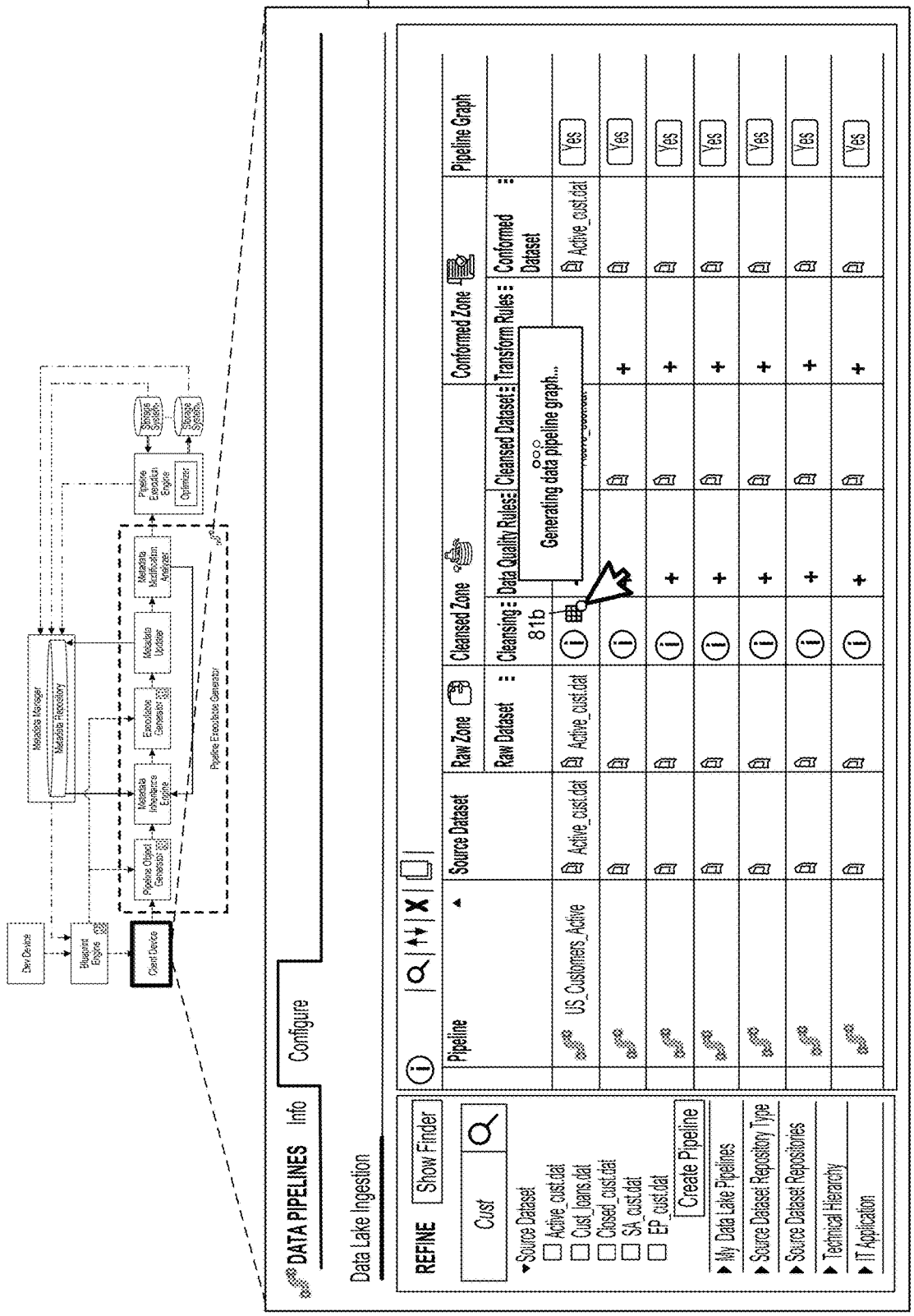

Referring to FIG. 5C, selection of icon 81b results in a preview of the data that is being ingested into the system in accordance with the cleansing, conforming, transforming a data quality rule.

Figure 5D:
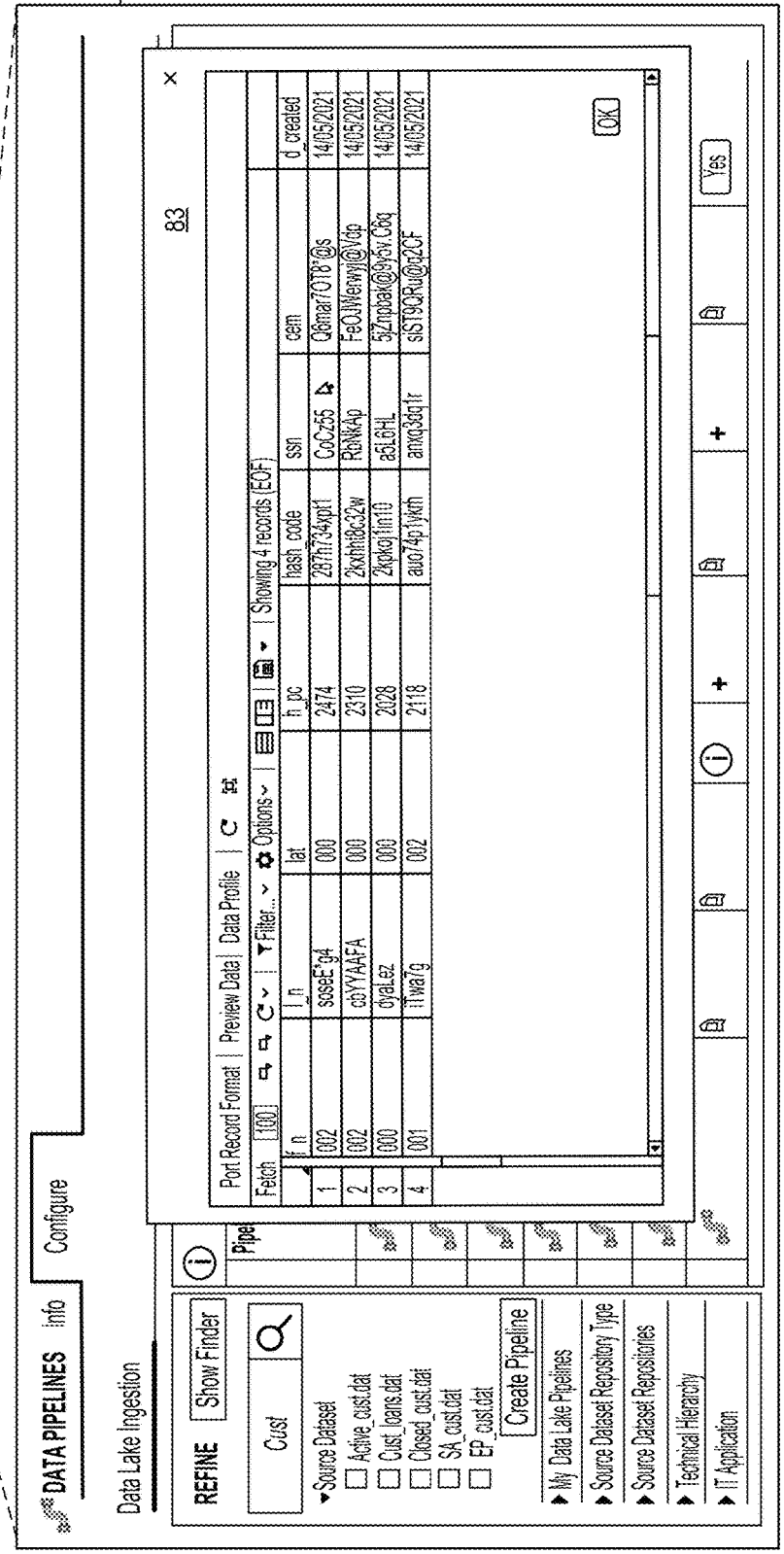

Referring to FIG. 5D, overlay 83 illustrates a preview of the data records and the source dataset that have been cleansed and conformed in accordance with the blueprint and in accordance with the stated rules.

Figure 6A:
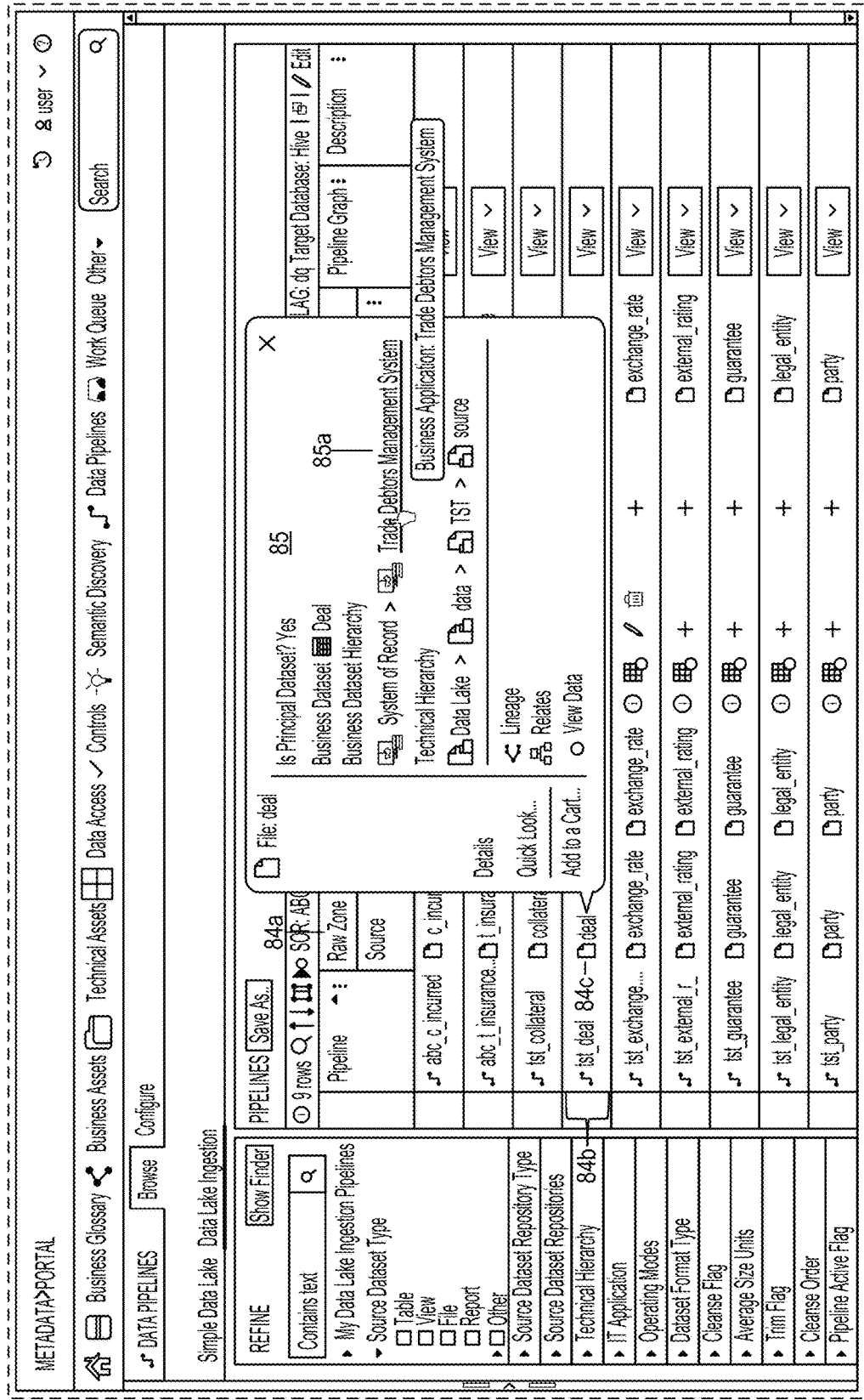

Referring to FIG. 6A, graphical user interface 84 provides for viewing of an underlying source dataset. In this example, graphical user interface 84 includes column 84*a* representing source datasets in a raw zone. In this example, row 84*b* represents a particular pipeline. Cell 84*c* within row 84*b* includes a selectable portion, selection of which causes a rendering of overlay 85. Overlay 85 includes details of the source dataset that is being ingested by the pipeline, specified by row 84*b*. In this example, overlay 85 includes selectable portion 85*a*, selection of which enables a user to view controls that are being applied to the dataset.

Referring to FIG. 6B, graphical user interface 86 is rendered following selection of selectable portion 85*a*. In this example, cell 87 displays a description of one of the controls that is being applied to this particular dataset. Selection of cell 87 causes display of the graphical user interface described in FIG. 6C.

Figure 6C:
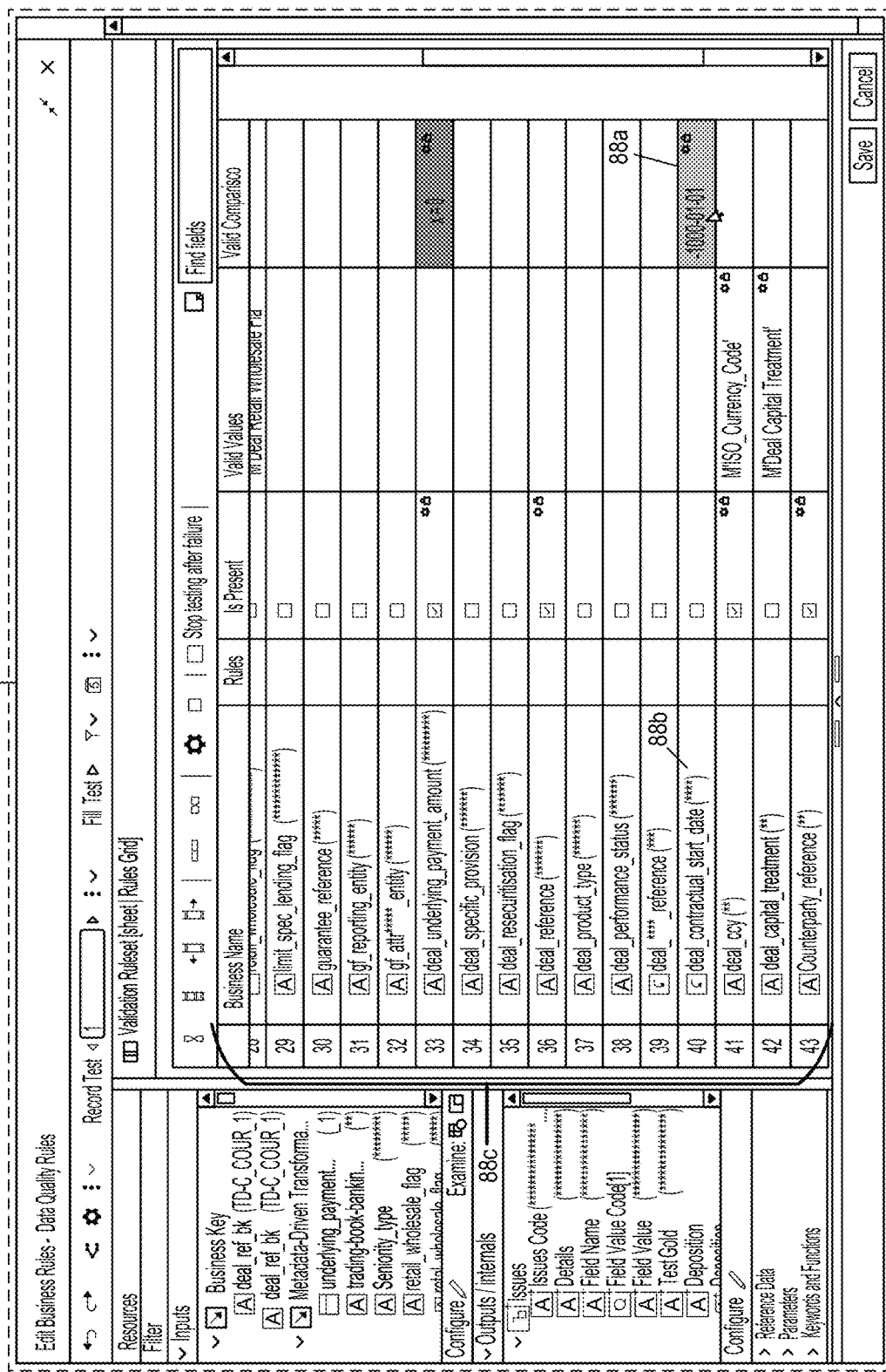

Referring to FIG. 6C, graphical user interface 88 is displayed. Graphical user interface 88 includes portion 88*c*, which displays the business names of fields to which the control described in cell 87 is applied. In this example, portion 88*c* also indicates if a particular field has failed the control. In this example, the field represented by the business name shown in cell 88*b* has failed this control as indicated in cell 88*a*. By providing this real-time review of the data, and which controls have succeeded or failed for which fields, the system described herein, provides a very granular level of result review.

Figure 7:
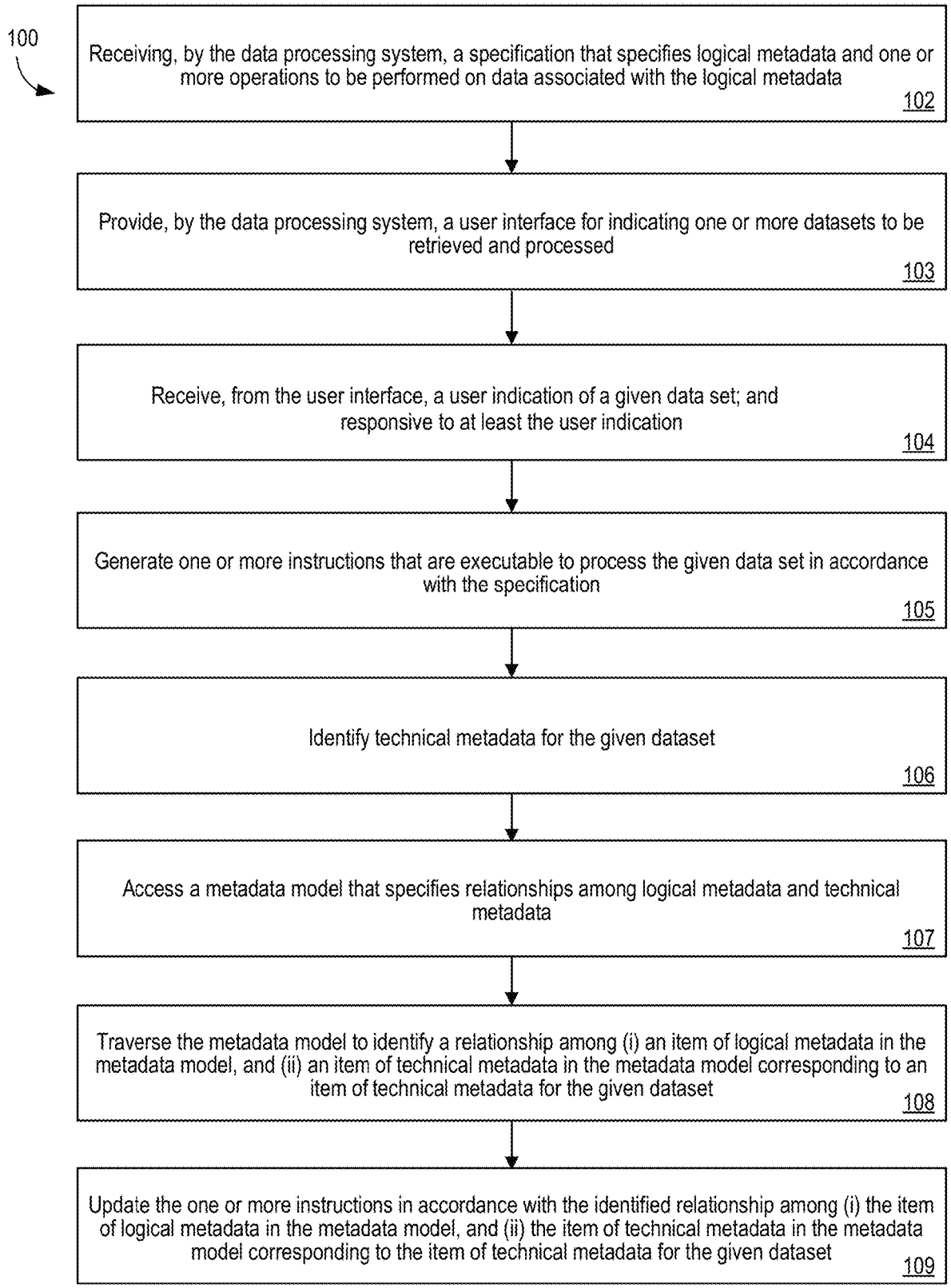
FIG. 7 is a flow diagram of an example process for self-service data pipelining.

Referring to FIG. 7, a process 100 is shown for generating an on-demand integrated profile. In operation, a data processing system receives (102) a specification that specifies logical metadata, such as PII, and one or more operations, such as one or more data synthetization operations (e.g., masking, hashing, reducing, generalizing and/or obfuscating), to be performed on data associated with the logical metadata. The data processing system provides (103) a user interface for indicating one or more datasets to be retrieved and processed. The data processing system receives (104), from the user interface, a user indication of a given dataset. Responsive to at least the user indication, the data processing system generates (105) one or more instructions that are executable to process the given dataset in accordance with the specification, such as to maintain data security by performing the data synthetization operations on the data that includes PII. The data processing system identifies (106) technical metadata, such as fields, for the given dataset. The data processing system accesses (107) a metadata model that specifies relationships among logical metadata and technical metadata. The data processing system traverses (108) the metadata model to identify a relationship among (i) an item of logical metadata (e.g., PII) in the metadata model, and (ii) an item of technical metadata (e.g., a field) in the metadata model corresponding to an item of technical metadata for the given dataset. The data processing system updates (109) the one or more instructions in accordance with the identified relationship among (i) the item of logical metadata in the metadata model, and (ii) the item of technical metadata in the metadata model corresponding to the item of technical metadata for the given dataset, such that, for example, execution of the instructions to process the given dataset in accordance with the specification leads to maintaining data security by performing the data synthetization operations on the data that includes PII.

In some examples, traversing the metadata model includes identifying a relationship among (i) an item of logical metadata in the metadata model corresponding to logical metadata of the specification, and (ii) an item of technical metadata in the metadata model corresponding to an item of technical metadata for the given dataset. Based on the identified relationship, the one or more instructions executable to process the given dataset can be modified or otherwise updated to specify that at least one of the operations associated with the logical metadata in the specification are to be performed on data of the given dataset represented by the item of technical metadata that corresponds to the item of technical metadata in the metadata model.

In some examples, traversing the metadata model includes identifying a data quality control or other control to be applied to the item of technical metadata in the metadata model that corresponds to an item of technical metadata for the given dataset, and updating the one or more instructions executable to process the given dataset includes modifying or otherwise updating the one or more instructions with additional instructions to apply the data quality control to data corresponding to the item of technical metadata for the given dataset.

As described herein, dataflow graph components include data processing components and/or datasets. A dataflow graph can be represented by a directed graph that includes nodes or vertices, representing the dataflow graph components, connected by directed links or data flow connections, representing flows of work elements (i.e., data) between the dataflow graph components. The data processing components include code for processing data from at least one data input, (e.g., a data source) and providing data to at least one data output, (e.g., a data sink) of a system. The dataflow graph can thus implement a graph-based computation performed on data flowing from one or more input datasets through the graph components to one or more output datasets.

A system also includes a data processing system for executing one or more computer programs (such as dataflow graphs), which were generated by the transformation of a specification into the computer program(s) using a transform generator and techniques described herein. The transform generator transforms the specification into the computer program. In this example, the selections made by user through the user interfaces described here form a specification that specify which data sources to ingest. Based on the specification, the transforms described herein are generated.

The data processing system may be hosted on one or more general-purpose computers under the control of a suitable operating system, such as the UNIX operating system. For example, the data processing system can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely distributed (e.g., multiple processors coupled via LAN or WAN networks), or any combination thereof.

The graph configuration approach described above can be implemented using software for execution on a computer. For instance, the software forms procedures in one or more computer programs that execute on one or more systems, e.g., computer programmed or computer programmable systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger computer program, for example, that provides other services related to the design and configuration of dataflow graphs. The nodes and elements of the graph can be implemented as data structures stored in a computer readable medium or other organized data conforming to a data model stored in a data repository.

The software may be provided on a non-transitory storage medium, such as a hardware storage device, e.g., a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the dataflow specified by the software are performed by different computers. Each such computer program is preferably stored on or downloaded to a non-transitory storage media or hardware storage device (e.g., solid state memory or media, or magnetic or optical media) readable by a general or special purpose programmable computer, for configuring and operating the computer when the non-transitory storage media or device is read by the system to perform the procedures described herein. The system may also be considered to be implemented as a computer-readable storage medium, configured with a computer program, where the storage medium so configured causes the system to operate in a specific and predefined manner to perform the functions described herein.

Example Computing Environment

Figure 8:
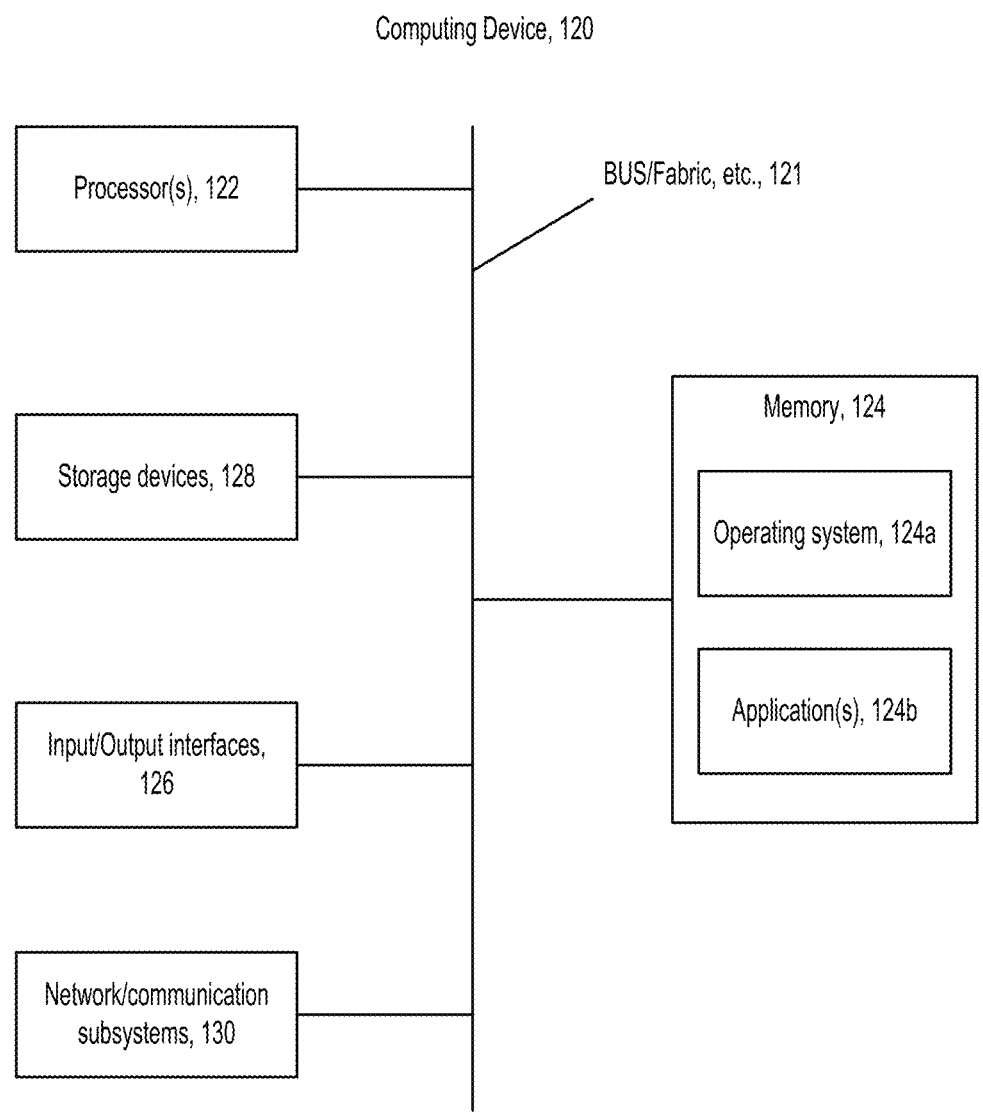
FIG. 8 is a diagram showing details of a computer system, such as a data processing system.

Referring to FIG. 8, an example operating environment for implementing embodiments of the present invention is shown and designated generally as computing device 120. Essential elements of a computing device 120 or a computer or data processing system or client or server are one or more programmable processors 122 for performing actions in accordance with instructions and one or more memory devices 124 for storing instructions and data. Generally, a computer will also include, or be operatively coupled, (via bus 121, fabric, network, etc.) to I/O components 126, e.g., display devices, network/communication subsystems, etc. (not shown) and one or more mass storage devices 128 for storing data and instructions, etc., and a network communication subsystem 130, which are powered by a power supply (not shown). In memory 124, are an operating system 124*a* and applications 124*b* for application programming.

Devices suitable for storing computer program instructions and data include all forms of non-volatile memory, media and memory devices including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification are implemented on a computer having a display device (monitor) for displaying information to the user and a keyboard, a pointing device, (e.g., a mouse or a trackball) by which the user can provide input to the computer. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the user device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program. Accordingly, other embodiments are within the scope of the following claims.

What is claimed is:

1. A method implemented by a data processing system for processing data in conformance with specified criteria by providing a graphical user interface for selecting data to be processed, determining metadata of selected data, and, based on the metadata, automatically processing the selected data in conformance with the specified criteria, including:

receiving, by a data processing system, a specification that specifies one or more criteria for data by specifying logical metadata and one or more operations to be performed on data associated with the logical metadata;

providing, by a data processing system, a user interface for indicating one or more datasets to be retrieved and processed;

receiving, from the user interface, a user indication of a given dataset;

responsive to at least the user indication, identifying technical metadata for the given dataset;

accessing, from a storage device, a metadata model that specifies relationships among logical metadata and technical metadata;

traversing, by a data processing system, the metadata model accessed from the storage device to identify a relationship among (i) an item of logical metadata in the metadata model corresponding to an item of the logical metadata specified in the specification, and (ii) an item of technical metadata in the metadata model corresponding to an item of the technical metadata for the given dataset;

based on the identified relationship, determining that at least one of the one or more operations are to be performed on data associated with the given dataset and with the item of technical metadata for the given dataset;

generating, by a data processing system, an executable computer program configured to:
  perform the determined at least one of the one or more operations on the data associated with the given dataset and with the item of technical metadata for the given dataset such that the data is in accordance with the one or more criteria; and
  after performing the determined at least one of the one or more operations, store, in a storage device, the data that is in accordance with the one or more criteria; and executing, by a data processing system, the executable computer program to perform operations including:
  performing, by a data processing system, the determined at least one of the one or more operations on the data associated with the given dataset and with the item of technical metadata for the given dataset such that the data is in accordance with the one or more criteria; and
  after performing the determined at least one of the one or more operations, storing, in the storage device, the data that is in accordance with the one or more criteria.

2. The method of claim 1, wherein the item of the technical metadata for the given dataset is a given item of technical metadata associated with a given data item associated with the given dataset, and wherein the method further includes:
  based on the identified relationship, identifying that the given item of data is associated with the given item of technical metadata corresponding to the item of technical metadata in the metadata model; and
  identifying that the one or more criteria are applicable to the given item of data.

3. The method of claim 1, further including:
  based on the traversing, identifying a data quality control associated with the item of technical metadata in the metadata model corresponding to an item of technical metadata for the given dataset.

4. The method of claim 1, further including:
  updating the metadata model based on execution of the executable computer program;
  detecting that the execution causes updating of the metadata model;
  traversing the metadata model to identify one or more relationships among (i) data added to the metadata model based on the execution, and (ii) other data in the metadata model; and
  based on the identified one or more relationships, updating the executable computer program in accordance with the one or more relationships among (i) the data added to the metadata model based on the updating, and (ii) the other data in the metadata model.

5. The method of claim 4, further including:
  based on determining no additional updates to the metadata model,
    outputting the executable computer program with updated instructions for execution; or
    storing the executable computer program for execution.

6. The method of claim 1, further including:
  receiving, from a metadata system, identifiers of data that are candidates for processing in accordance with the one or more criteria; and
  causing the user interface to render graphical visualizations of the identifiers.

7. The method of claim 1, further including:
  accessing the given dataset.

8. One or more non-transitory machine-readable hardware storage devices for processing data in conformance with specified criteria by providing a graphical user interface for selecting data to be processed, determining metadata of selected data, and, based on the metadata, automatically processing the selected data in conformance with the specified criteria, the one or more machine-readable hardware storage devices storing instructions that are executable by one or more processing devices to perform operations including:
  receiving a specification that specifies one or more criteria for data by specifying logical metadata and one or more operations to be performed on data associated with the logical metadata;
  providing a user interface for indicating one or more datasets to be retrieved and processed;
  receiving, from the user interface, a user indication of a given dataset;
  responsive to at least the user indication, identifying technical metadata for the given dataset;
  accessing, from a storage device, a metadata model that specifies relationships among logical metadata and technical metadata;
  traversing the metadata model accessed from the storage device to identify a relationship among (i) an item of logical metadata in the metadata model corresponding to an item of the logical metadata specified in the specification, and (ii) an item of technical metadata in the metadata model corresponding to an item of technical metadata for the given dataset;
  based on the identified relationship, determining that at least one of the one or more operations are to be performed on data associated with the given dataset and with the item of technical metadata for the given dataset;
  generating an executable computer program configured to:
    perform the determined at least one of the one or more operations on the data associated with the given dataset and with the item of technical metadata for the given dataset such that the data is in accordance with the one or more criteria; and after performing the determined at least one of the one or more operations, store, in a storage device, the data that is in accordance with the one or more criteria; and executing the executable computer program to perform operations including:

performing the determined at least one of the one or more operations on the data associated with the given dataset and with the item of technical metadata for the given dataset such that the data is in accordance with the one or more criteria; and after performing the determined at least one of the one or more operations, storing, in the storage device, the data that is in accordance with the one or more criteria.

9. The one or more non-transitory machine-readable hardware storage devices of claim 8, wherein the item of the technical metadata for the given dataset is a given item of technical metadata associated with a given data item associated with the given dataset, and wherein the operations further include:

based on the identified relationship, identifying that the given item of data is associated with the given item of technical metadata corresponding to the item of technical metadata in the metadata model; and identifying that the one or more criteria are applicable to the given item of data.

10. The one or more non-transitory machine-readable hardware storage devices of claim 8, wherein the operations further include:

based on the traversing, identifying a data quality control associated with the item of technical metadata in the metadata model corresponding to an item of technical metadata for the given dataset.

11. The one or more non-transitory machine-readable hardware storage devices of claim 8, wherein the operations further include:

updating the metadata model based on execution of the executable computer program;

detecting that the execution causes updating of the metadata model;

traversing the metadata model to identify one or more relationships among (i) data added to the metadata model based on the execution, and (ii) other data in the metadata model; and based on the identified one or more relationships, updating the executable computer program in accordance with the one or more relationships among (i) the data added to the metadata model based on the updating, and (ii) the other data in the metadata model.

12. The one or more non-transitory machine-readable hardware storage devices of claim 11, wherein the operations further include:

based on determining no additional updates to the metadata model,
transmitting the executable computer program with updated instructions for execution; or
storing the executable computer program for execution.

13. The one or more non-transitory machine-readable hardware storage devices of claim 8, wherein the operations further include:

receiving, from a metadata system, identifiers of data that are candidates for processing in accordance with the one or more criteria; and causing the user interface to render graphical visualizations of the identifiers.

14. A system for processing data in conformance with specified criteria by providing a graphical user interface for selecting data to be processed, determining metadata of selected data, and, based on the metadata, automatically processing the selected data in conformance with the specified criteria, including:

one or more processing devices; and one or more non-transitory machine-readable hardware storage devices storing instructions that are executable by one or more processing devices to perform operations including:

receiving a specification that specifies one or more criteria for data by specifying logical metadata and one or more operations to be performed on data associated with the logical metadata;

providing a user interface for indicating one or more datasets to be retrieved and processed;

receiving, from the user interface, a user indication of a given dataset;

responsive to at least the user indication, identifying technical metadata for the given dataset;

accessing, from a storage device, a metadata model that specifies relationships among logical metadata and technical metadata;

traversing the metadata model accessed from the storage device to identify a relationship among (i) an item of logical metadata in the metadata model corresponding to an item of the logical metadata specified in the specification, and (ii) an item of technical metadata in the metadata model corresponding to an item of technical metadata for the given dataset;

based on the identified relationship, determining that at least one of the one or more operations are to be performed on data associated with the given dataset and with the item of technical metadata for the given dataset;

generating an executable computer program configured to:

perform the determined at least one of the one or more operations on the data associated with the given dataset and with the item of technical metadata for the given dataset such that the data is in accordance with the one or more criteria; and after performing the determined at least one of the one or more operations, store, in a storage device, the data that is in accordance with the one or more criteria; and executing the executable computer program to perform operations including:

performing the determined at least one of the one or more operations on the data associated with the given dataset and with the item of technical metadata for the given dataset such that the data is in accordance with the one or more criteria; and after performing the determined at least one of the one or more operations, storing, in the storage device, the data that is in accordance with the one or more criteria.

15. The system of claim 14, wherein the item of the technical metadata for the given dataset is a given item of technical metadata associated with a given data item associated with the given dataset, and wherein the operations further include:

based on the identified relationship, identifying that the given item of data is associated with the given item of technical metadata corresponding to the item of technical metadata in the metadata model; and
identifying that the one or more criteria are applicable to the given item of data.

16. The system of claim 14, wherein the operations further include:
based on the traversing, identifying a data quality control associated with the item of technical metadata in the metadata model corresponding to an item of technical metadata for the given dataset.

17. The system of claim 14, wherein the operations further include:
updating the metadata model based on execution of the executable computer program;
detecting that the execution causes updating of the metadata model;
traversing the metadata model to identify one or more relationships among (i) data added to the metadata model based on the execution, and (ii) other data in the metadata model; and
based on the identified one or more relationships, updating the executable computer program in accordance with the one or more relationships among (i) the data added to the metadata model based on the updating, and (ii) the other data in the metadata model.

18. The system of claim 17, wherein the operations further include:
based on determining no additional updates to the metadata model,
transmitting the executable computer program with updated instructions for execution; or
storing the executable computer program for execution.

19. The system of claim 14, wherein the operations further include:
receiving, from a metadata system, identifiers of data that are candidates for processing in accordance with the one or more criteria; and
causing the user interface to render graphical visualizations of the identifiers.

20. The method of claim 1, wherein the one or more operations specified by the specification are associated with the item of logical metadata in the metadata model, and
whereby an efficiency in processing the given dataset is improved by the one or more operations specified by the specification being automatically applied to data associated with the item of technical metadata with the relationship in the metadata model to the item of logical metadata associated with the one or more operations.

21. The method of claim 1, further including:
storing information about the one or more criteria to be applied to data stored in a plurality of network-based non-transitory storage devices;
providing remote access to one or more first users over a network so that any one of the one or more first users can update the information about the one or more criteria to be applied to the data in real time through a graphical user interface, with the one or more criteria being independent of a field name associated with data;
storing the updated information about the one or more criteria to be applied to the data stored in the plurality of network-based non-transitory storage devices;
automatically generating and executing the executable computer program in accordance with the updated information about the one or more criteria whenever updated information is stored to ingest the data in accordance with the updated information about the one or more criteria; and
responsive to the executing, transmitting to the one or more network-based non-transitory storage devices updated data in accordance with the updated information about the one or more criteria so that one or more second users have near real-time access to data that is in accordance with the updated information about the one or more criteria.

22. The method of claim 1, wherein the one or more criteria specify that data of a given type is masked, wherein the item of logical metadata in the metadata model represents the given type of data, wherein the one or more operations are one or more masking operations, wherein the logical metadata in the specification specifies the given type of data, and wherein the method includes:
accessing, over a network, data of the given dataset, with the data being of the given type to be masked;
based on traversing the metadata model, determining that the data of the given dataset is the given type of data, by:
identifying a relationship among (i) the item of logical metadata in the metadata model specifying the given type of data, and (ii) the item of technical metadata in the metadata model corresponding to an item of the technical metadata for the data of the given dataset;
based on the received specification and on the determining that the data of the given dataset is the given type of data, determining that at least one of the one or more masking operations are to be performed on the data of the given dataset;
generating, by a data processing system, an executable computer program configured to:
perform the determined at least one of the one or more masking operations on the data of the given dataset such that the data is masked; and
after performing the determined at least one of the one or more masking operations, store, in a storage device, the masked data; and
executing, by a data processing system, the executable computer program to perform operations including:
masking the data by performing the determined at least one of the one or more masking operations on the data; and
storing, in the storage device, the masked data.

23. The method of claim 22, wherein the data of the given dataset includes data specified by the given dataset, data included in the given dataset or data associated with the given dataset.

* * * * *

UNITED STATES PATENT AND TRADEMARK OFFICE
CERTIFICATE OF CORRECTION

PATENT NO. : 12,346,350 B2
APPLICATION NO. : 18/496543
DATED : July 1, 2025
INVENTOR(S) : Marshall A. Isman et al.

Page 1 of 1

It is certified that error appears in the above-identified patent and that said Letters Patent is hereby corrected as shown below:

On the Title Page

Column 1, Line 1 (item (54) title), delete "META-DATA" and insert -- METADATA --

In the Specification

Column 1, Line 1, delete "META-DATA" and insert -- METADATA --

Signed and Sealed this
Second Day of September, 2025

Coke Morgan Stewart
*Acting Director of the United States Patent and Trademark Office*